Oct. 12, 1954  G. J. KOREN  2,691,194
HYDRAULICALLY CONTROLLED FOUNDRY FLASK FILLING APPARATUS
Filed Sept. 8, 1949  16 Sheets-Sheet 1

Inventor
George J. Koren
By: Fred Gerlach Atty.

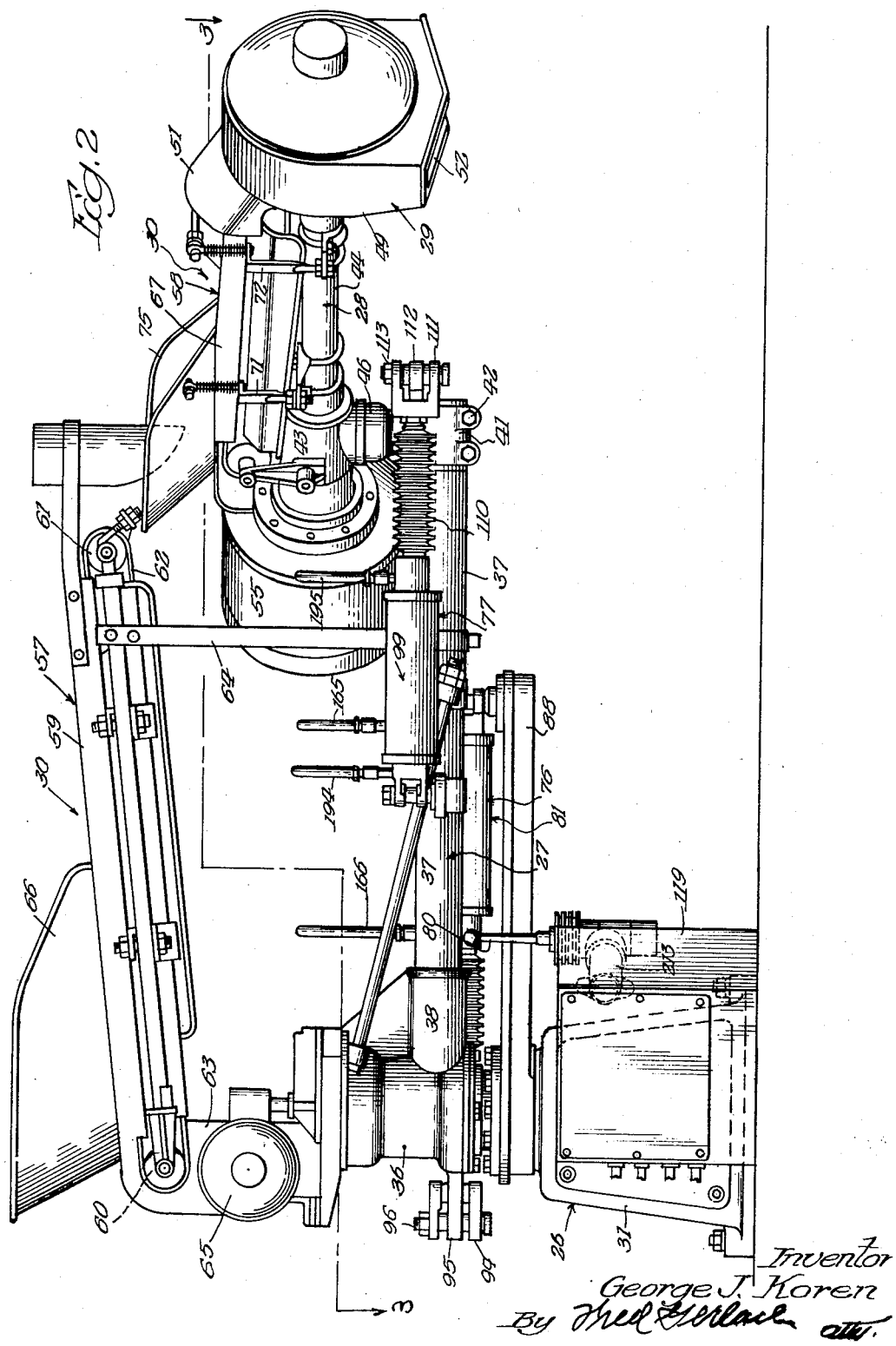

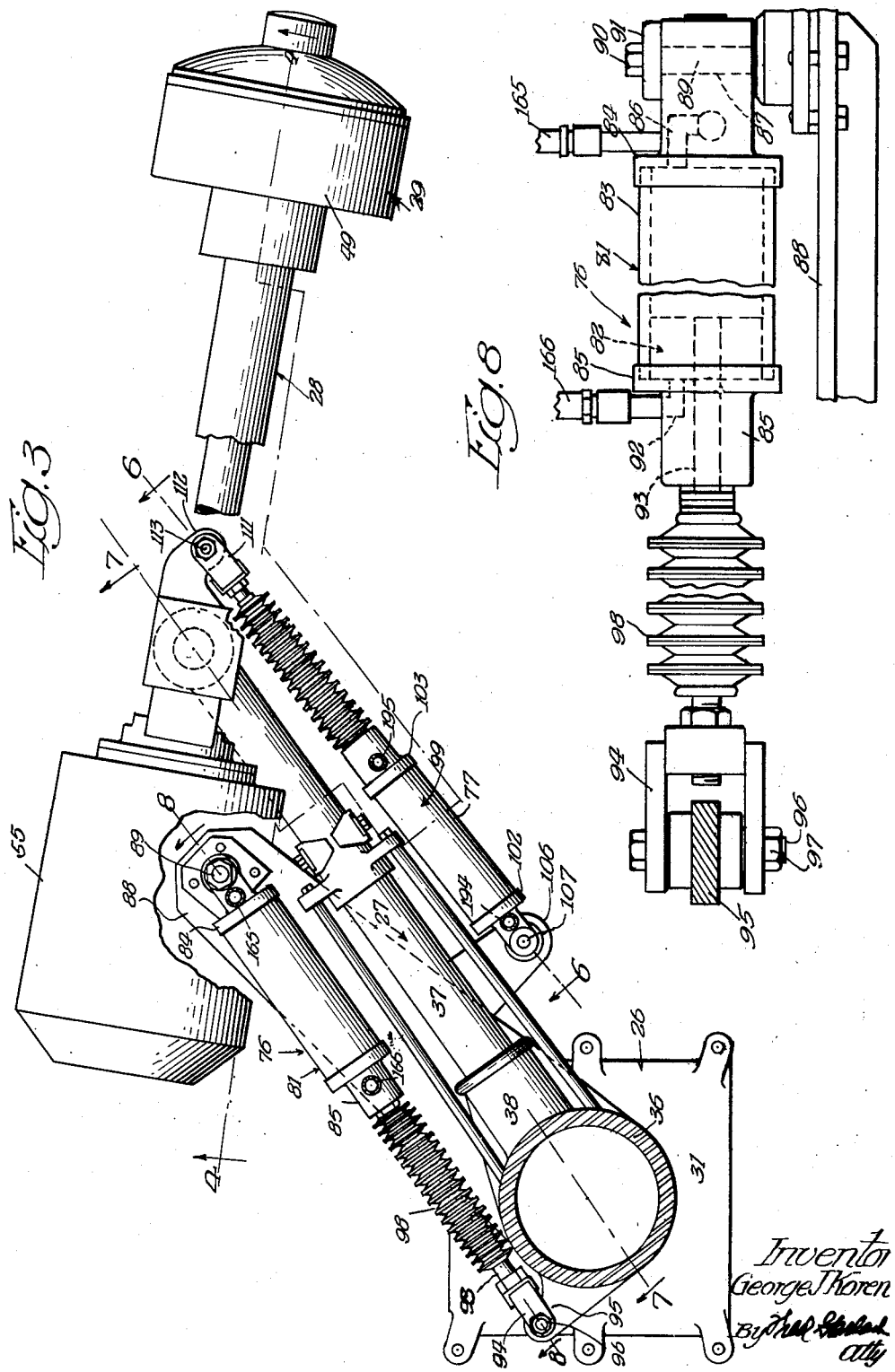

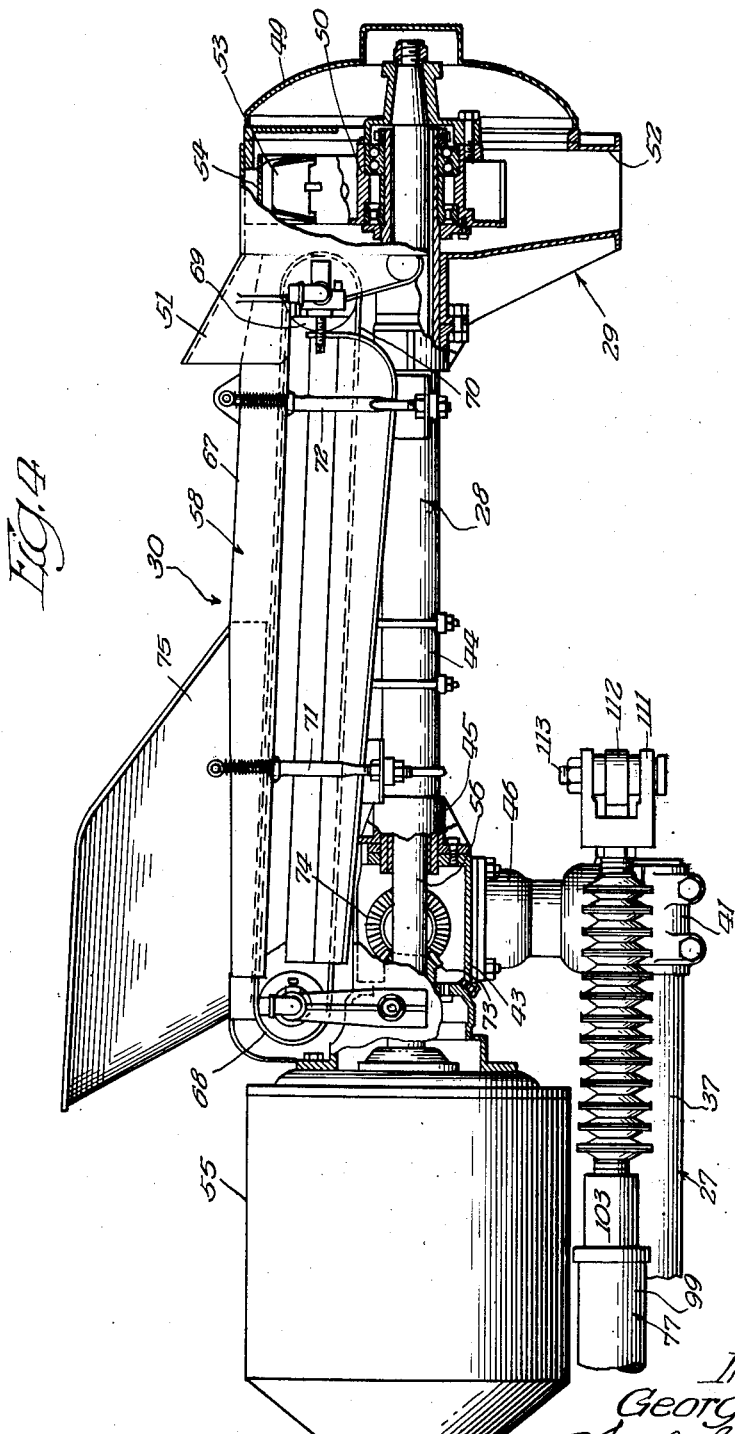

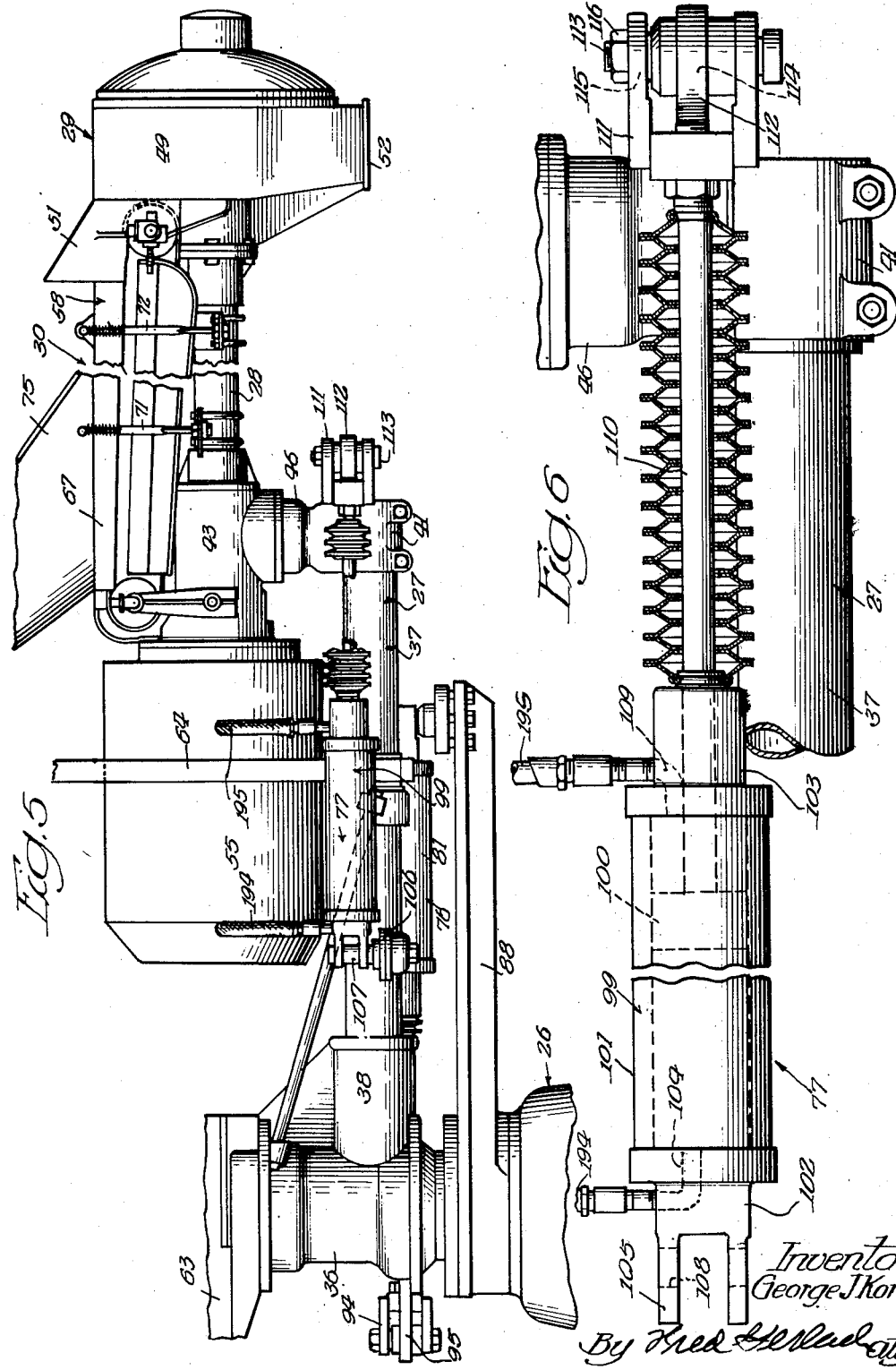

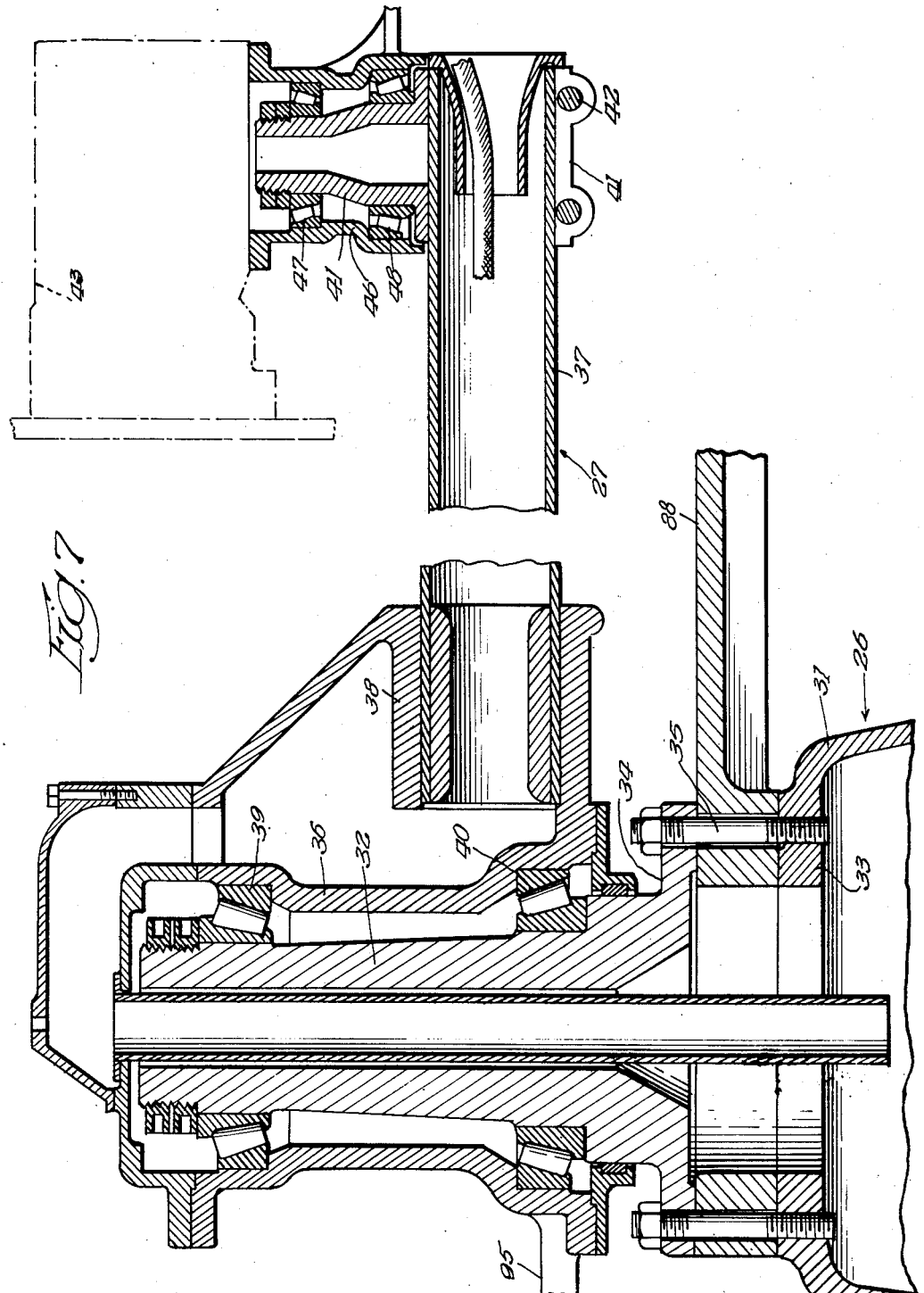

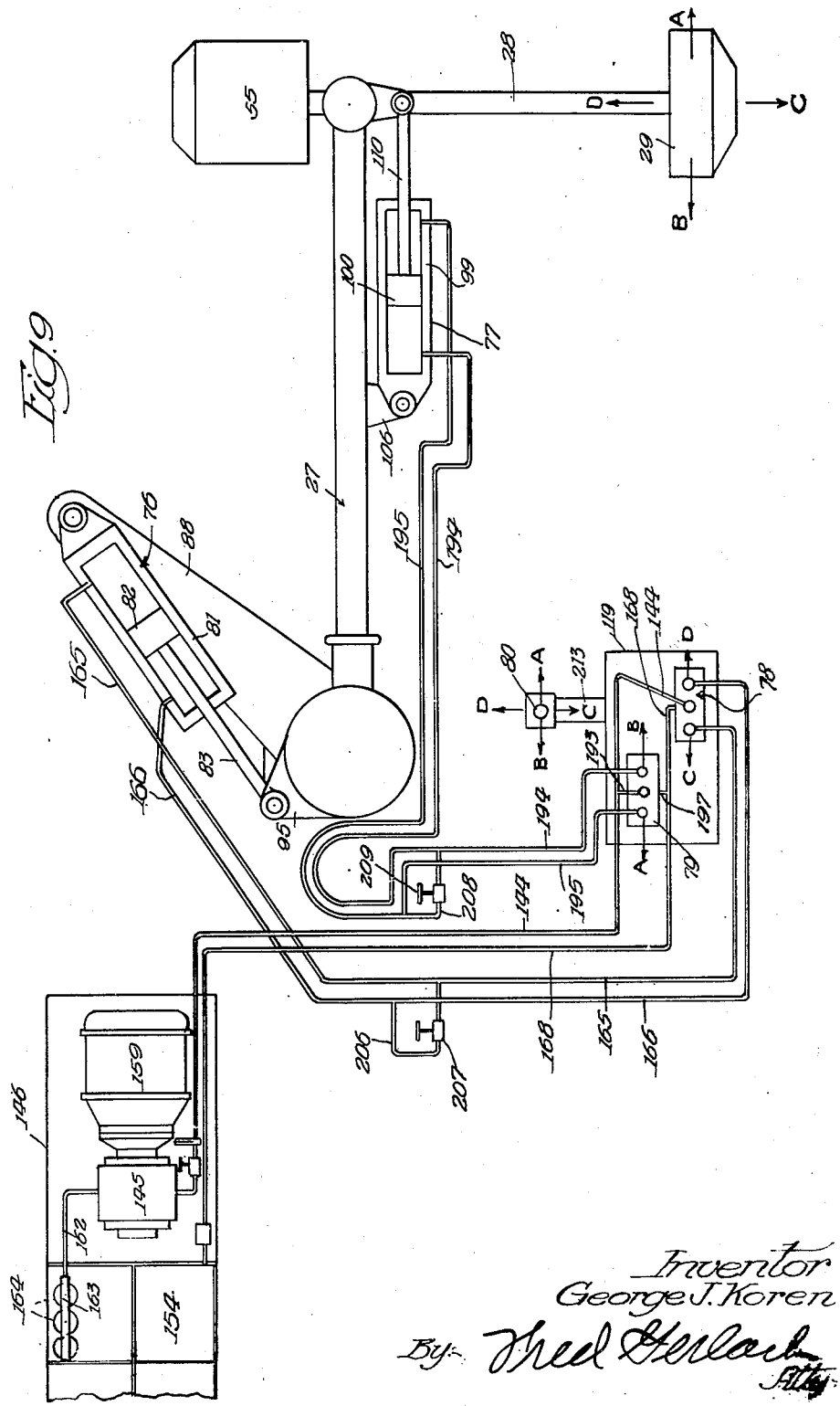

Oct. 12, 1954 G. J. KOREN 2,691,194
HYDRAULICALLY CONTROLLED FOUNDRY FLASK FILLING APPARATUS
Filed Sept. 8, 1949 16 Sheets-Sheet 8
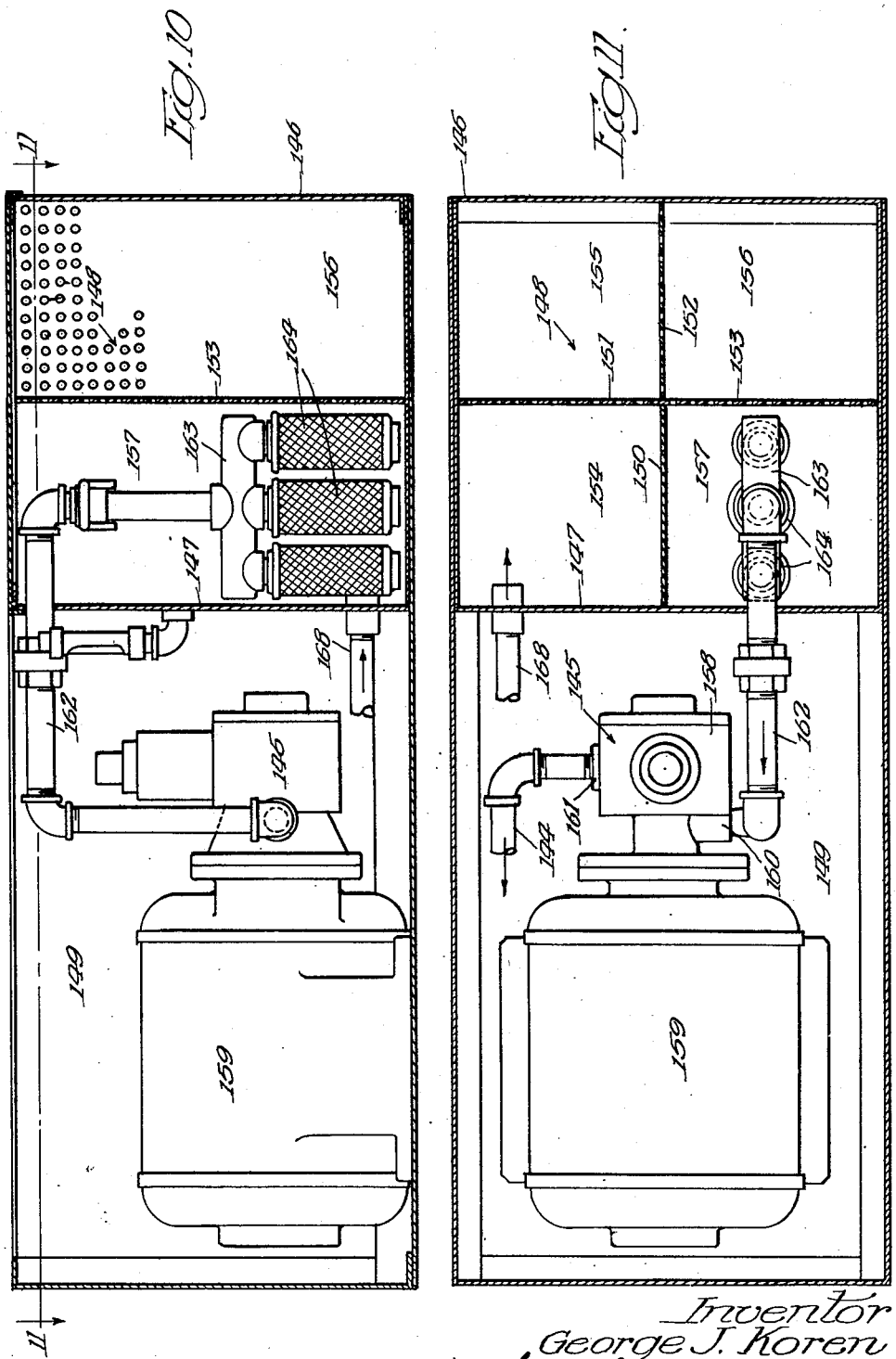
Inventor
George J. Koren
By Fred Gerlach Atty.

Oct. 12, 1954   G. J. KOREN   2,691,194
HYDRAULICALLY CONTROLLED FOUNDRY FLASK FILLING APPARATUS
Filed Sept. 8, 1949   16 Sheets-Sheet 9

Inventor
George J. Koren
By Fred Gerlach
Atty.

Inventor
George J. Koren
By Thed Gerlach atty.

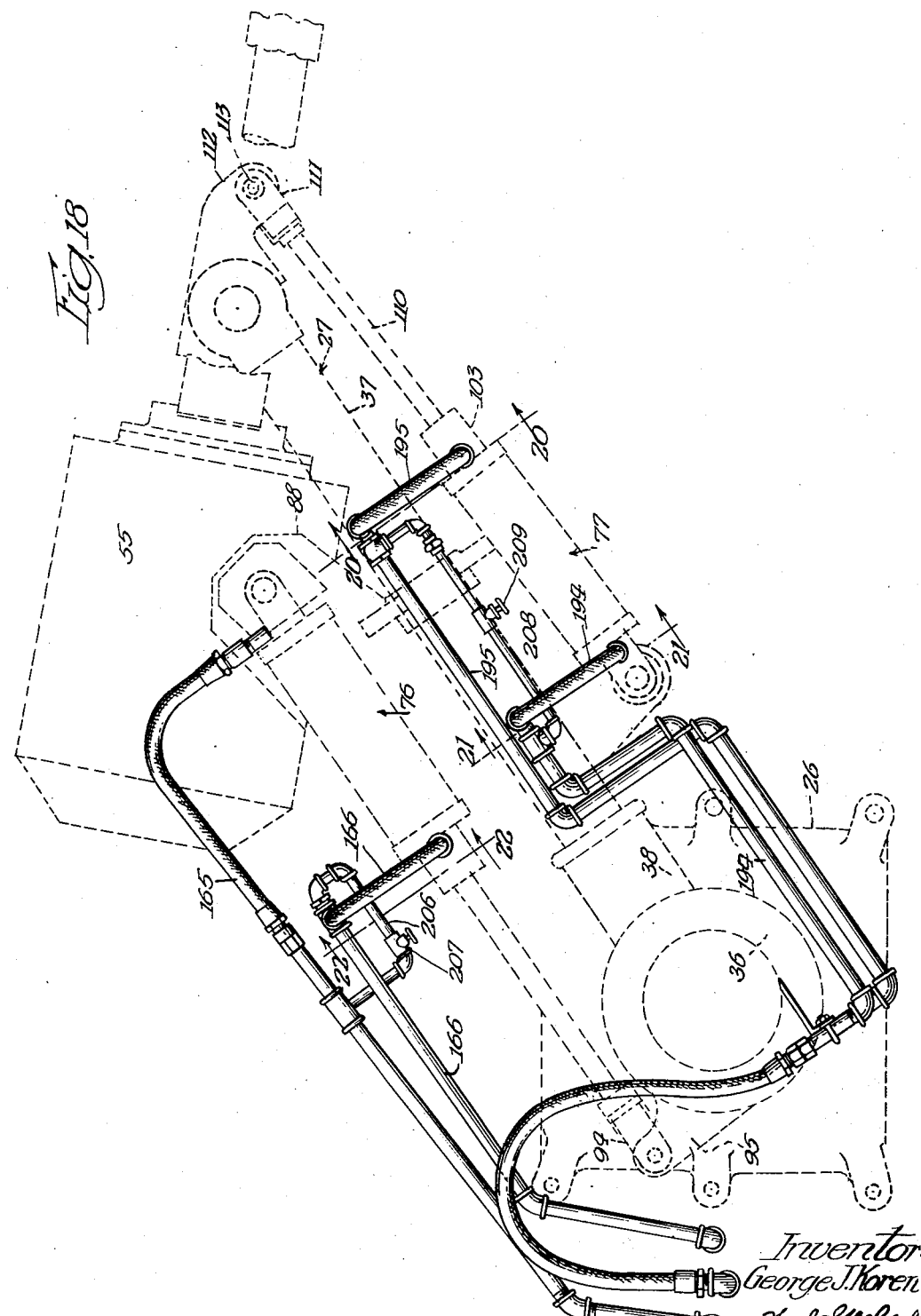

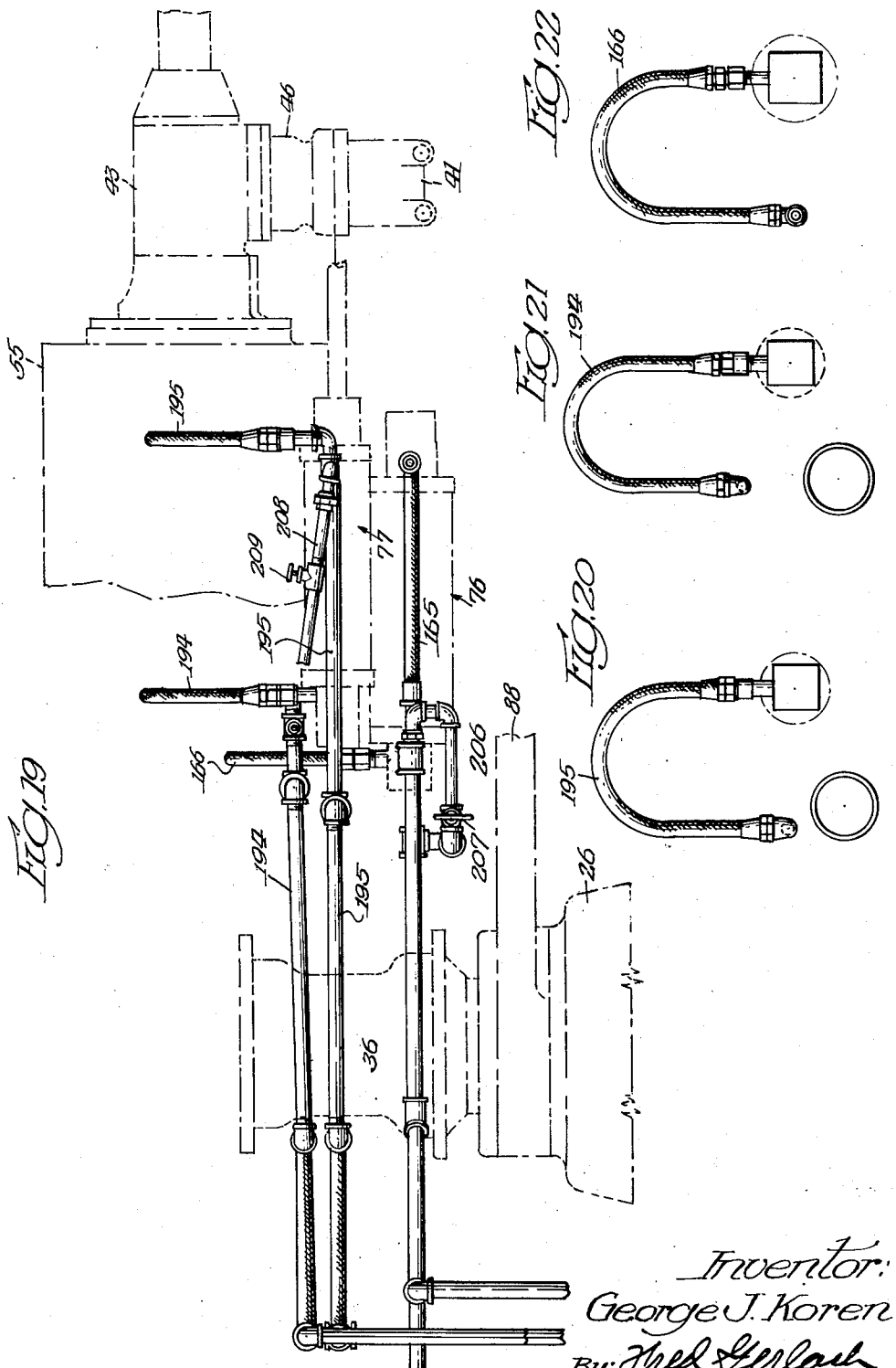

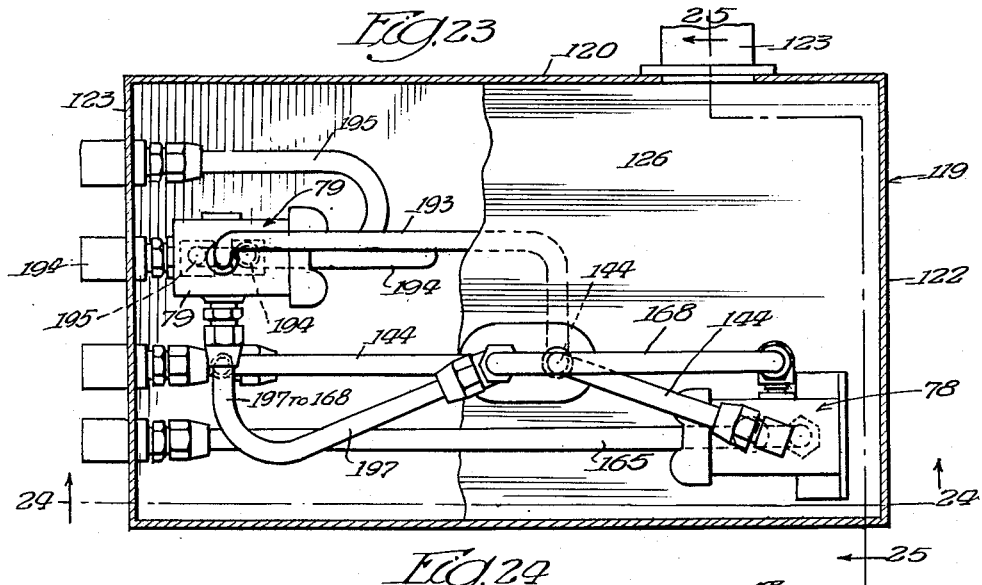
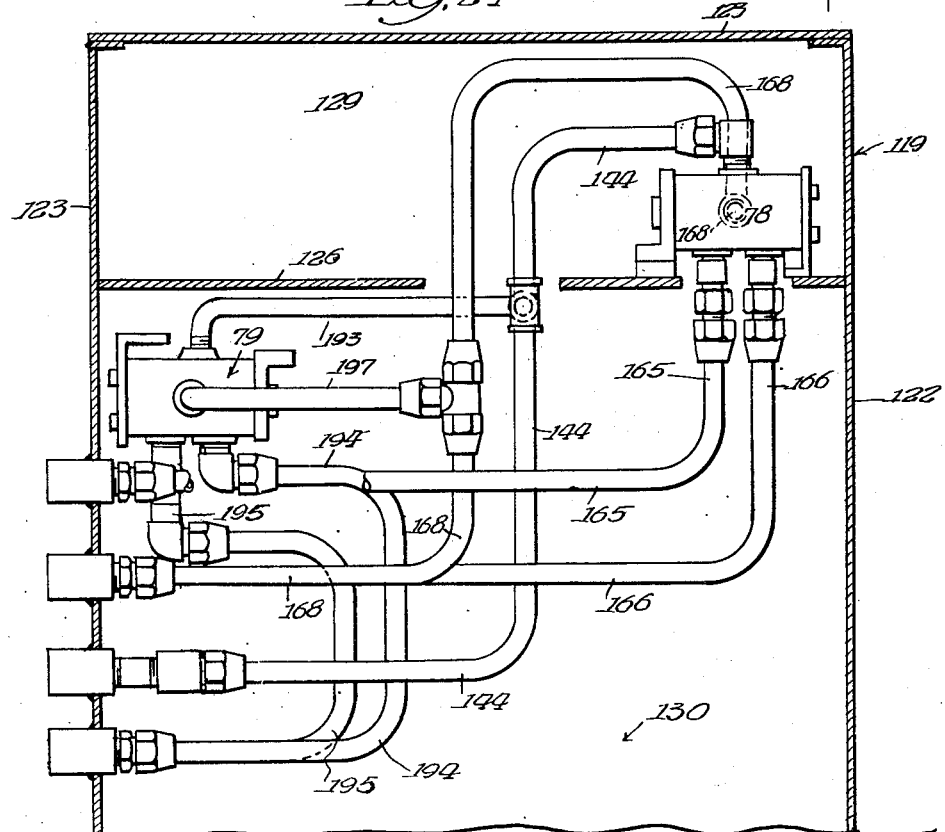

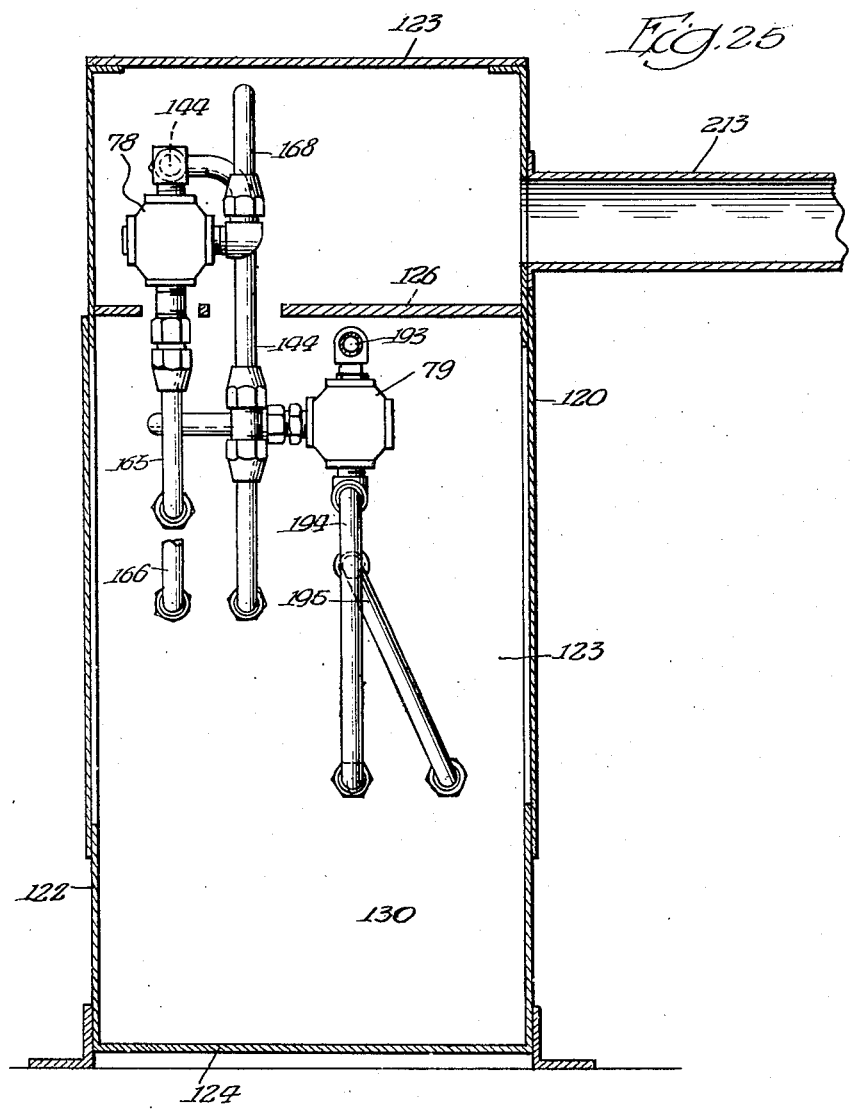

UNITED STATES PATENT OFFICE 2,691,194

HYDRAULICALLY CONTROLLED FOUNDRY FLASK FILLING APPARATUS

George J. Koren, Chicago, Ill., assignor to Pettibone Mulliken Corporation, Chicago, Ill., a corporation of Delaware Application September 8, 1949, Serial No. 114,572

3 Claims. (Cl. 22—36)

The present invention relates generally to apparatus for filling foundry flasks with molding sand in connection with the formation of castings. More particularly the invention relates to that type of foundry flask filling apparatus which is known in the art as a "Sandslinger" and comprises as its principal components or parts: (1) a standard which is adapted to rest on the floor of the foundry in which the apparatus is used; (2) a horizontally extending jib which has one end thereof connected to the upper end of the standard to rotate or swing back and forth about a vertical axis; (3) a horizontal arm which has one end thereof connected to the distal end of the jib to rotate or swing back and forth about a vertical axis; (4) a rotary, motor driven projector which is mounted on the distal end of the arm, operates in connection with delivery of a stream of sand thereto to form the sand into wads and to project the wads downwards into a subjacent flask for filling purposes and, due to the pivotal connections for the jib and arm, is capable of being moved horizontally and universally to a limited extent in order to effect ramming with wads of sand all portions of the subjacent flask; and (5) two endless, substantially horizontal conveyors which are mounted on, and movable with, the jib and arm respectively and serve to deliver molding sand in stream form from a hopper over the proximal end of the jib to the projector on the distal end of the arm.

As evidenced by United States Patent No. 2,339,001, dated January 11, 1944, it has heretofore been proposed to provide a flask filling apparatus of the aforementioned type with an hydraulic system which serves automatically to control horizontal movement of the projector, comprises cylinder and piston units in associated relation with the jib and arm respectively, valve type controlling devices for the units and an upstanding joy-stick variety lever on the projector for actuating singly or compoundly the valve type controlling devices, and is so constructed or arranged that the projector is caused to move correspondingly and proportionally to movement of the lever from a vertical neutral position and at a rate of speed determined by the amount of angular displacement of the lever from its neutral position. In practice it has been found that a foundry flask filling apparatus having such an hydraulic projector control system is subject to certain objections even though it efficiently fulfills its intended purpose. In the first place it is necessary for the operator of the apparatus to travel or move with the projector due to the fact that the joy-stick variety lever is mounted on the projector; secondly, the system must be built into the apparatus at the time of manufacture because of the complex type of operating connections between the joy-stick variety control lever and the valve type controlling devices; and thirdly, the system is extremely costly because it involves the use of racks and pinions for swinging the jib and arm in response to actuation of their respective cylinder and piston units.

One object of the invention is to provide an hydraulically controlled foundry flask filling apparatus which is an improvement upon, and eliminates the objections to, previously designed apparatus, such, for example, as that forming the subject matter of said Patent No. 2,339,001, and is characterized by less complexity and cost of manufacture of the hydraulic control system for effecting movement of the projector during a flask filling or ramming operation.

Another object of the invention is to provide a foundry flask filling apparatus of the type under consideration in which the valve type controlling devices for the cylinder and piston units of the hydraulic system and the joy-stick variety lever for singly or compoundly actuating such units are supported on a housing structure which is stationarily mounted adjacent the standard to the end that the operator of the apparatus does not have to move or travel with the projector in connection with a flask filling or ramming operation.

A further object of the invention is to provide an hydraulically controlled flask filling apparatus of the type last mentioned in which the valve type controlling devices are directly and operatively connected to the joy-stick variety lever by mechanical connections of novel form and character and the housing structure on which the valve type controlling devices and the joy-stick variety lever are mounted is capable of being moved into different operating positions relatively to the standard without disturbing the relationship of movement of the projector on the distal end of the arm and the control lever of the hydraulic system.

A still further object of the invention is to provide an hydraulically controlled foundry flask filling apparatus which is generally of new and improved construction, involves a novel arrangement of parts, effectively and efficiently fulfills its intended purpose and may be produced at a comparatively low cost.

Other objects of the invention and the various advantages and characteristics of the present flask filling apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 2 is a side elevation of the standard, jib, arm, projector and endless sand conveyors of the apparatus;

Figure 3 is a horizontal section taken on the line 3—3 of Figure 2 and illustrating in detail the construction and manner of mounting of the cylinder and piston units for swinging the jib and the projector carrying arm;

Figure 4 is an enlarged section taken on the line 4—4 of Figure 3 and showing in detail the manner in which the arm is pivotally connected to the distal end of the jib and illustrating the construction and design of the projector and the manner in which it and the endless conveyor over the arm are motor driven;

Figure 5 is an enlarged side view of the jib of the apparatus illustrating in detail the manner in which it is constructed and pivotally connected to the upper end of the standard;

Figure 6 is an enlarged section taken on the line 6—6 of Figure 3 and showing the cylinder and piston unit for swinging the projector carrying arm relatively to the jib;

Figure 7 is an enlarged vertical section taken on the line 7—7 of Figure 3 and illustrating the construction and arrangement of the pivotal connection between the jib and the upper end of the standard;

Figure 8 is an enlarged vertical section taken on the line 8—8 of Figure 3 and showing in detail the construction and design of the cylinder and piston unit for swinging the jib horizontally with respect to the standard;

Figure 9 is a diagrammatic view of the hydraulic system for automatically effecting horizontal movement of the rotary motor driven projector on the distal end of the arm;

Figure 10 is a vertical longitudinal section of the housing which contains the oil reservoir and the motor driven pump forming parts of the hydraulic control system of the apparatus;

Figure 11 is a horizontal section on the line 11—11 of Figure 10;

Figure 18 is a plan view of the oil carrying pipes that are associated with the cylinder and piston units and form parts of the hydraulic control system of the apparatus;

Figure 19 is a side view of the pipes that are shown in Figure 18;

Figure 1:
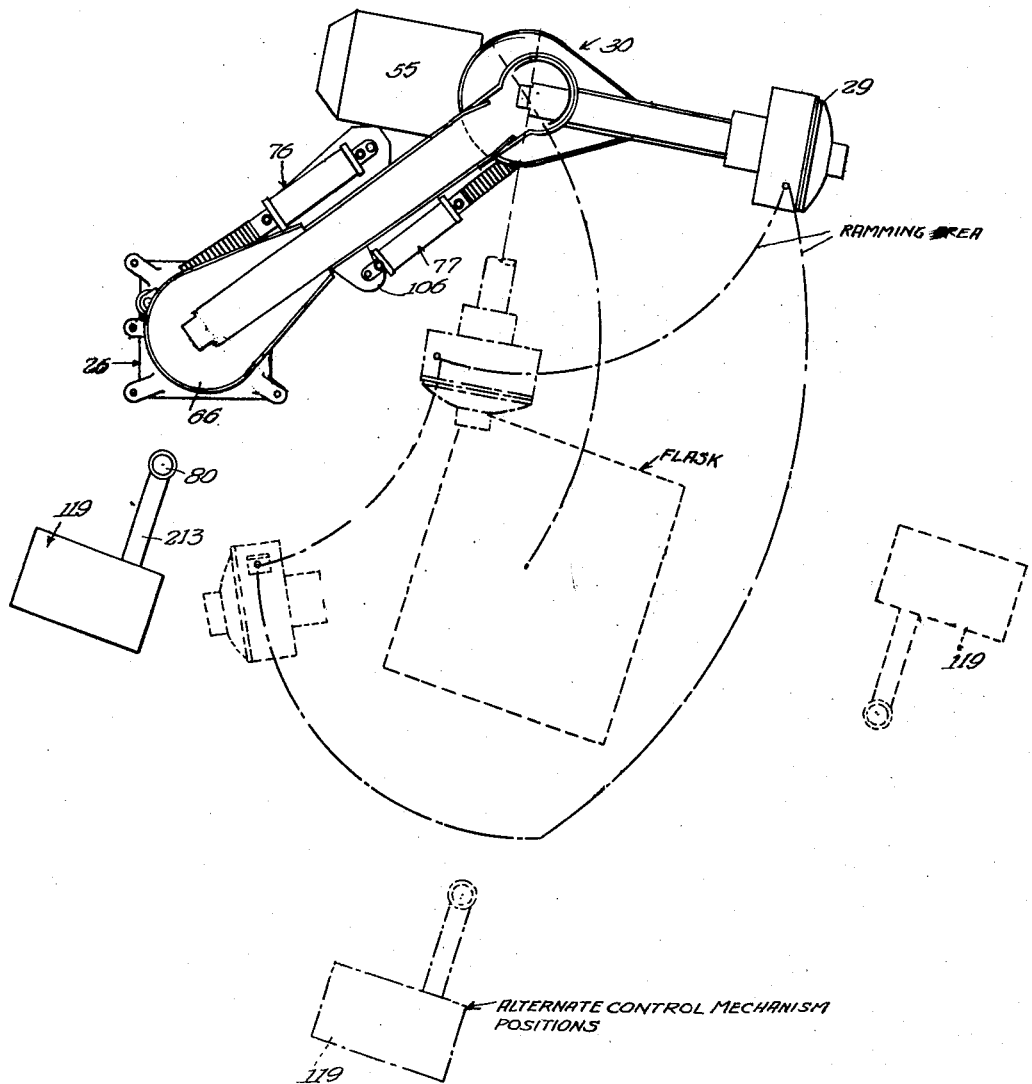
Figure 1 is a diagrammatic plan showing the general arrangement of parts and the range or zone of projector movement of an hydraulically controlled flask filling or ramming apparatus embodying the invention.

Figures 20, 21 and 22 are vertical sections taken respectively on the lines 20—20, 21—21 and 22—22 of Figure 18;

Figure 23 is a plan view of the pipe connections within the housing structure on which the valve type controlling devices and the joy-stick variety lever are mounted; and Figures 24 and 25 are vertical sections taken respectively on the lines 24—24 and 25—25 of Figure 23.

The apparatus which is shown in the drawings constitutes the preferred form or embodiment of the invention. It is designed for use in a foundry and serves, as hereinafter described more in detail, as a medium or instrumentality for filling foundry flasks with molding sand in connection with the formation of castings. As its principal components or parts the apparatus comprises a standard 26, a horizontally extending jib 27, a horizontally extending arm 28, a rotary motor driven projector 29, power operated mechanism 30 for delivering a stream of sand to the projector, and an hydraulic system for effecting movement of the projector in connection with a flask filling operation. All of such parts, with the exception of the hydraulic control system for effecting or controlling movement of the projector, are conventional and together form what is known in the art as a "sandslinger."

The standard 26 is adapted to rest on, and be bolted to, the floor of the foundry in which the apparatus is utilized. It is of composite character and consists of a base 31 and a vertically extending spindle 32. The base is preferably in the form of a hollow one-piece casting and embodies a top wall 33. The spindle 32 is spaced above the base 31 of the standard and embodies at its lower end an outwardly extending flange 34 which is connected to the top wall 33 of the base by nut equipped studs 35. Generally speaking, the base 31 forms a supporting structure for the jib 27, the arm 28, the projector 29 and the mechanism 30 for delivering sand to the projector.

The jib 27 extends generally horizontally and consists of a vertically elongated tubular housing 36 and a horizontal tube 37. The housing 36 is in the form of a casting and surrounds and is spaced from the spindle 32 constituting part of the standard 26. It constitutes the proximal end of the jib 27 and embodies at one side thereof an integral, laterally extending sleeve 38. An upper roller bearing 39 between the upper ends of the spindle 32 and the housing 36 and a lower roller bearing 40 between the lower ends of the spindle and housing form a pivotal connection whereby the jib 27 as a whole is permitted to swing sideways about a vertical axis. The tube 37 is in fixed relation with, and extends radially from, the housing 36. The inner end of the tube is disposed within, and rigidly connected to, the sleeve 38 and the outer end of the tube is provided with an upstanding pivot forming spindle 41. The lower end of the spindle 41 is in the form of a split collar which, as shown in Figure 7, extends around, and is secured by clamp bolts 42 to, the outer end of the tube 37.

The horizontal arm 28 is disposed a small distance above the jib 27 and consists of a housing 43 and a tube 44. The housing 43 is in the form of a casting and embodies at one side thereof a socket forming member 45 and at its bottom a depending, vertically elongated hub member 46. The latter surrounds and is spaced from the spindle 41 as shown in Figure 7. An upper roller bearing 47 between the upper ends of the spindle 41 and the hub 46 and a lower roller bearing 48 between the lower ends of the spindle and the hub form a pivotal connection whereby the arm 28 is mounted to swing back and forth in a horizontal plane relatively to the jib. The housing 43 constitutes the proximal end of the arm 28. The tube 44 extends horizontally and has one end thereof disposed within, and fixedly secured to, the socket forming member 45 on the housing 43.

The projector 29 is mounted on the distal end of the arm 28 and consists of a housing 49 and a rotor 50 within the housing. The housing 49 of the projector is suitably fixedly secured to the outer end of the tube 44 and embodies at its upper inner portion an inlet opening 51 and at its lower portion an outlet opening 52. The rotor 50 is disposed within the central portion of the housing 49 and embodies a single radially extending cup shaped blade 53 as shown in Figure 4. The blade, in connection with drive of the rotor, so coacts with an arcuate liner 14 in the housing as to form sand that is delivered in stream form into the housing inlet opening 51 as hereinafter described, into wads and projects the wads downwards through the outlet opening 52 into a subjacent flask. An electric motor 55 and a horizontal shaft 56 serve to drive the rotor. The motor 55 is fixedly secured to the housing 43 of the arm 28 and is arranged so that the armature shaft thereof is in coaxial relation with the tube 44. The shaft 56 extends through said tube and housing and has its inner end suitably connected to the adjacent end of the armature shaft of the electric motor 55. The outer end of the shaft 56 projects into the central portion of the housing 49 and is keyed or otherwise fixedly secured to the hub part of the projector rotor 50.

The mechanism 30 for delivering molding sand in stream form into the inlet opening 51 in the upper inner portion of the projector housing 49 comprises an endless conveyor 57 over the jib 27 and an endless conveyor 58 over the projector carrying arm 28. The conveyor 57 extends lengthwise of the jib 27 and comprises an elongated frame 59, a drive pulley 60, a driven pulley 61 and an endless belt 62 around the two pulleys. The end of the frame 59 that overlies the proximal end of the jib 27 is supported by a bracket structure 63 which is suitably connected to the upper end of the housing 36 of the jib. The other end of the frame 59 is supported by a pair of upstanding braces 64, the lower ends of which are suitably secured to the tube 37 of the jib 27. The drive pulley 60 is supported rotatably at the inner end of the frame 59, i. e., the end of the frame that overlies the proximal end of the jib 27. It is driven by an electric motor 65 though the medium of gearing (not shown) which is disposed in the bracket structure 63. The driven pulley 61 is rotatably mounted at the outer end of the frame 59. The drive pulley 60 is driven in a clockwise direction as viewed in Figure 2 to the end that the upper reach of the endless belt 62 moves from the inner end of the frame 59 to the outer end. A hopper 66 is mounted on the inner end of the frame 59 and serves to direct sand from an overhead supply source (not shown) onto the receiving end of the upper reach of the endless belt 62. The endless conveyor 58 is adapted to receive sand from the discharge end of the upper reach of the endless belt 62 of the conveyor 57 and feed the sand in stream form into the projector housing 49 via the inlet opening 51. It extends lengthwise of the projector carrying arm 28 and comprises an elongated frame 67, a drive pulley 68, a driven pulley 69, and an endless belt 70 around the two pulleys. The inner end of the frame 67 is supported by a bracket structure 71 and the outer end of the frame is supported by a bracket structure 72. The lower portions of these two structures are suitably connected to the end portions of the tube 44. The drive pulley 68 of the endless conveyor 58 is rotatably mounted at the inner end of the frame 67 and is driven in a clockwise direction as viewed in Figure 4 by way of gearing which includes bevel gears 73 and 74. The gear 73 is located in the arm housing 43 and is keyed to, and driven by, the shaft 56 which, as heretofore pointed out, connects the rotor of the projector for drive by the electric motor 55. The bevel gear 74 meshes with, and is driven by, the bevel gear 73 and, like the latter, is disposed in the arm housing 43. The driven pulley 69 is rotatably mounted at the outer end of the frame 67 of the endless conveyor 58 and is disposed in the inlet opening 51 in the upper rear portion of the projector housing 49. When the endless conveyor 58 is in operation as the result of drive of the electric motor 55 the upper reach of the endless belt 70 travels from the inner end of the frame to the outer end. A hopper 75 is connected to the inner end of the frame 67 and is adapted to receive sand from the discharge end of the upper reach of the endless belt 62 of the conveyor 57 and to direct the sand onto the inner or receiving end of the upper reach of the endless belt 70. When the electric motors 55 and 65 are in operation the sand that is delivered from the aforementioned overhead supply into the hopper 66 is first delivered onto the upper reach of the belt 62 and then is discharged into the hopper 75. The latter directs the sand onto the receiving end of the upper reach of the belt 70 and then, after travelling on such upper reach, the sand is discharged in stream form into the housing 59 through the inlet opening 51. After entry into the upper portion of the projector housing the sand is subjected to the action of the cup shaped blade 53 on the projector rotor. Such blade, as heretofore described, forms the sand into wads and projects the wads in rapid succession through the discharge opening 52 into a subjacent flask. It is contemplated that in connection with a flask filling operation the projector 29 will be moved universally in a horizontal plane over the flask until the flask is filled to the proper or desired extent.

The hydraulic system for effecting movement of the projector in different directions over a flask in connection with a flask filling operation constitutes the essential novelty of the apparatus and comprises as certain parts thereof a cylinder and piston unit 76, a cylinder and piston unit 77, a valve type device 78 for controlling the unit 76, a valve type device 79 for controlling the cylinder and piston unit 77 and a joy-stick variety lever 80 for actuating singly or compoundly the devices 78 and 79.

The cylinder and piston unit 76 is of the double acting variety and serves to swing back and forth the jib 27. It is located at one side of the jib and consists of a cylinder 81 and a piston 82 (see Figure 8). The cylinder 81 of the unit 76 embodies a cylindrical side wall 83 and heads 84 and 85 at opposite ends of the side wall. As best shown in Figure 3 the cylinder 81 is arranged so that the head 84 is farther from the proximal end of the jib 27 than the head 85. The head 84 embodies a combined inlet and exhaust duct 86 which is in communication with the adjacent end of the interior of the cylinder 81 (see Figure 8). The outer end of the cylinder head 84 has a vertically extending bore 87 and is pivotally connected to the outer end of an arm 88 by way of an upstanding pivot pin 89. The arm 88 projects radially with respect to the standard 26 and has the inner end thereof clamped between the top wall 33 of the standard base 31 and the outwardly extending flange 34 at the lower end of the spindle 32 as shown in Figure 7. The pivot pin 89 has the lower end thereof bolted or otherwise fixedly secured to the outer end of the arm 88 and extends through the bore 87 in the outer end of the cylinder head 84. The upper end of the pivot pin 89 is provided with a nut 90 and a washer 91 for holding the cylinder head 84 against upward displacement. The head 85 at the inner end of the cylinder 81 is suitably connected to the adjacent end of the cylinder side wall 83 and is provided with a combined inlet and exhaust duct 92 which communicates with the adjacent end of the interior of the cylinder 81. The piston 82 of the unit 76 is mounted in the cylinder 81 to slide back and forth between the heads 84 and 85 and embodies a piston rod 93. The latter extends through, and is slidably mounted in, the cylinder head 85. The inner end of the piston rod 93 is suitably connected to the central portion of the piston 82 and the outer end of the rod is provided with a fork 94 and is pivotally connected to a lug 95 on the proximal end of the jib 27 by a vertically extending pivot pin 96. The lug 95 is formed integrally with, and projects laterally from, the lower end of the jib housing 36. The fork 95 on the outer end of the piston rod 93 is arranged in straddled relation with the outer end of the laterally extending lug 95. The vertically extending pivot pin 96 extends through a hole in the outer end of the lug 95 and aligned holes in the ends of the side pieces of the fork 94 and embodies nuts 97 at its ends for holding it against axial displacement. A bellows type sleeve 98 surrounds and serves as a dust guard for the outer portion of the piston rod 93. One end of the sleeve 98 is connected to the head 85 on the inner end of the cylinder 81 and the other end of the sleeve is suitably connected to the outer end of the rod at a point adjacent the crosspiece of the fork 94.

It is contemplated that the liquid medium for the hydraulic control system will be oil. When oil under pressure is introduced into the outer end of the cylinder 81 via the duct 86 the piston is slid towards the cylinder head 85 with the result that the unit 76 causes the jib 27 to swing in a counterclockwise direction as viewed in Figure 3. When oil under pressure is introduced into the inner end of the cylinder 81 via the duct 92 the piston 82 is caused to slide toward the cylinder head 84 with the result that the unit 76 swings the jib 27 in a clockwise direction as viewed in Figure 3. The flow of oil into one end of the cylinder 81 and exhaust of oil from the other end is controlled by the valve type device 78 as hereinafter described.

The cylinder and piston unit 77 serves to swing the projector carrying arm 28 relatively to the jib 27 and is disposed in substantially parallel relation with the jib. As shown in Figure 3 the cylinder and piston unit 76 is located at one side of the jib 27 and the unit 77 is located at the other side. The cylinder and piston unit 77 consists of a cylinder 99 and the piston 100. The cylinder 99 comprises a cylindrical side wall 101 and heads 102 and 103 at opposite ends of the side wall 101 and is arranged so that the head 103 is further from the proximal end of the jib than the head 102. The last mentioned head embodies a combined inlet and exhaust duct 104 and has the outer end thereof shaped to form a fork 105. The duct 104, as shown in Figure 6, communicates with the adjacent end of the interior of the cylinder 99. The head 102 of the cylinder 99 is pivotally connected to a horizontal lug 106 on the central portion of the jib 27 by way of a vertically extending pivot pin 107. The lug 106 is welded or otherwise fixedly secured to, and projects outwards from, the tube 37 constituting a part of the jib. The pivot pin 107 is fixedly connected to the outer end of the lug 106 and extends through aligned holes 108 in the side pieces of the fork 105 at the outer end of the cylinder head 102. The head 103 of the cylinder 99 is suitably connected to the adjacent end of the cylindrical side wall 101 and embodies a combined inlet and exhaust duct 109 which communicates with the outer end of the interior of the cylinder 99. The piston 100 is mounted in the cylindrical side wall 101 to slide back and forth between the heads 102 and 103 and is provided with a piston rod 110. The latter extends through, and is slidably mounted in, the head 103 at the outer end of the cylinder 99 and has its inner end fixedly connected to the central portion of the piston 100. The outer end of the piston rod 110 has a fork 111 fixedly connected thereto and is pivotally connected to a laterally extending lug 112 on the proximal end of the projector carrying arm 28 by way of a vertically extending pivot pin 113. The lug 112 is connected to, and formed integrally with the lower end of the hub member 46 at the bottom of the housing 43 constituting the inner part of the arm 28. The pivot pin 113 extends through a vertical hole 114 in the outer end of the lug 112 and aligned holes 115 in the ends of the side pieces of the fork 111 and has a nut 116 at its end for holding it in place. A bellows type guard sleeve like the sleeve 98 serves to prevent dust and other foreign matter from lodging on the exposed portion of the piston rod 110. Such sleeve surrounds the exposed portion of the rod 110 and has one end thereof suitably connected to the outer end of the head 103 and its other end connected to the rod at a point directly inwards of the crosspiece of the fork 111. When oil under pressure is introduced into the inner end of the cylinder 99 via the duct 104 the piston 100 is caused to slide towards the cylinder head 103 with the result that the cylinder and piston unit 77 swings the projector carrying arm 28 in a counterclockwise direction as viewed in Figure 3. When oil under pressure is introduced into the outer end of the cylinder 99 via the duct 109 the piston 100 is caused to slide towards the cylinder head 102 with the result that the unit 77 swings the arm 28 in a clockwise direction as viewed in Figure 3. Introduction of oil under pressure into one end of the cylinder 99 and exhaust of oil from the other end of the cylinder is controlled by the valve type device 79 as described hereafter.

The arc of swing of the jib 27 is determined by the stroke of the piston 82 within the cylinder 81 of the cylinder and piston unit 76 and the arc of swing of the projector carrying arm 28 with respect to the jib 27 is determined by the stroke of the piston 100 in the cylinder 99 of the cylinder and piston unit 77. The zone or area of horizontal movement of the projector is shown in dot-dash lines in Figure 1 of the drawings. The cylinder and piston unit 76 is so proportioned that the jib 27 is permitted to swing back and forth throughout an arc of approximately 75° and the cylinder and piston unit 77 is so proportioned that the projector carrying arm 28 is permitted to swing back and forth throughout an arc of approximately 90°.

Figure 12:
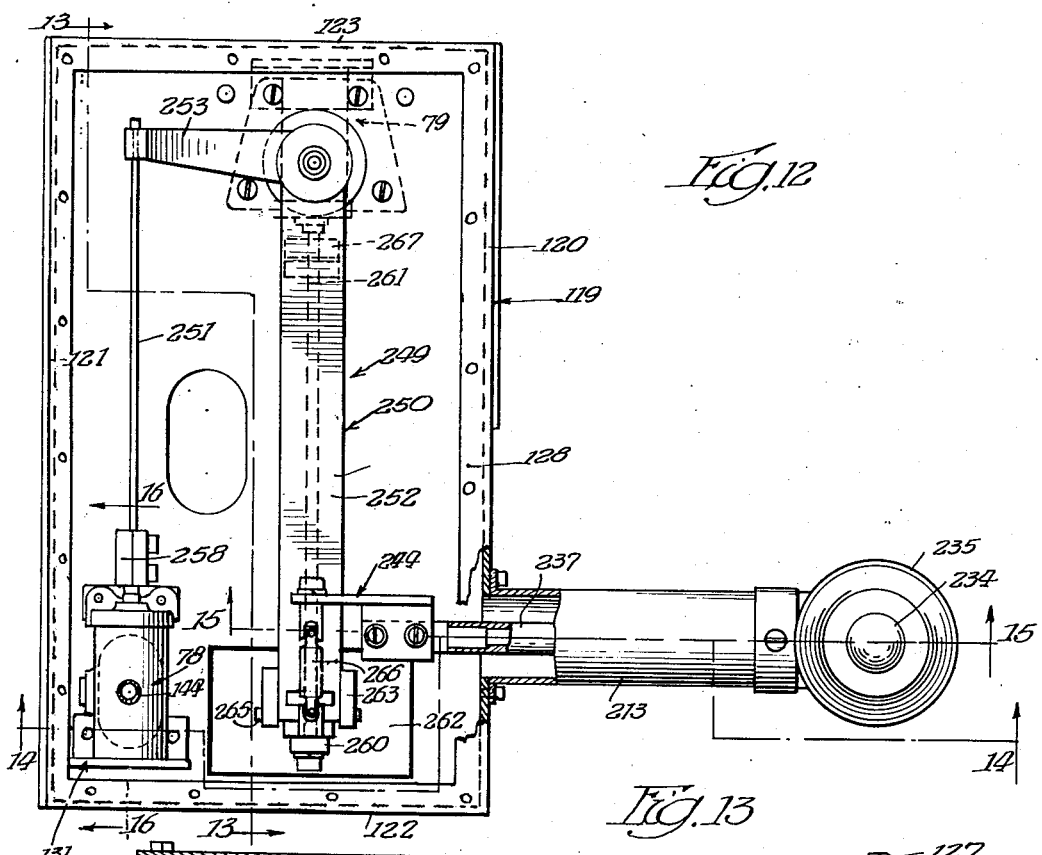
Figure 12 is a plan view showing without its cover the housing structure which is located stationarily adjacent the standard of the apparatus and has mounted thereon the valve type controlling devices for the cylinder and piston units and the upstanding joy-stick variety lever for actuating singly or compoundly such devices.
Figure 16:
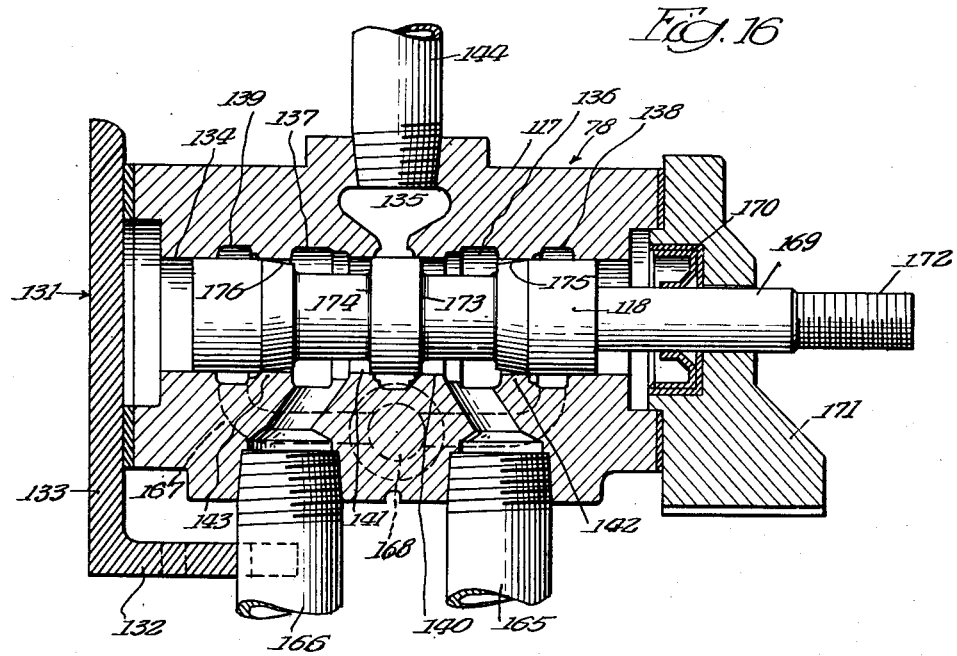
Figure 16 is an enlarged vertical longitudinal section of the valve variety device for controlling hydraulic actuation of the cylinder and piston device for swinging the jib.

The valve type controlling device 78 (see Figure 16) serves as a medium for controlling the flow of oil under pressure to and from opposite ends of the cylinder of the cylinder and piston unit 76 and comprises a horizontally elongated body 117 and a valve spool 118. It is actuated by the joy-stick variety lever 80 as hereinafter described and, as best shown in Figure 12, is disposed in a box-like housing structure 119. The latter is stationarily mounted at one side of the standard 26 of the apparatus and consists of a front wall 120, a back wall 121, side walls 122 and 123, a bottom wall 124, a removable cover forming top wall 125, and a horizontal partition 126. The side walls 122 and 123 extend between, and are connected to, the end margins of the front and back walls and the bottom wall 124 is connected to the bottom margins of the front, back and side walls. The cover forming top wall 125 is removably secured by bolts 127 to inwardly extending flanges 128 on the top margins of the front, back and side walls. The partition 126 is disposed a compartively small distance beneath the top wall 125 and divides the interior of the housing structure 119 into an upper compartment 129 and a lower compartment 130. The valve type controlling device 78 extends lengthwise of the housing structure and is disposed in the upper compartment 129 directly inwards of the joining margins of the back wall 121 and the side wall 122. An angle bracket 131 serves to secure the device 78 in an elevated position with respect to the horizontal partition 126 and consists of a horizontal leg 132 and an upwardly extending leg 133. The leg 132 is bolted or otherwise fixedly secured to the subjacent portion of the partition 126. One end of the body 117 is suitably secured to the upwardly extending leg 133 of the angle bracket 131. Said body 117 is provided in the central portion thereof with a longitudinally extending bore 134 and embodies around and in communication with the bore a centrally disposed annular inlet port 135, a pair of annular ports 136 and 137 outwards of the inlet port 135 and a pair of annular exhaust ports 138 and 139 outwards of the ports 136 and 137. The inlet port 135 and the port 136 are separated by an annular land 140; the inlet port 135 and the port 137 are separated by an annular land 141; the port 136 and the port 138 are separated by an annular land 142; and the ports 137 and 139 are separated by an annular land 143. The inlet port 135 is connected by a pipe 144 to receive oil under pressure from a pump 145 (see Figures 9, 10 and 11) in a box-like housing 146. The latter is stationarily mounted a sufficient distance from the housing structure 119 so that it does not in any way interfere with the movement of the projector 29. Within the housing 146 is a vertical transversely extending partition 147 which divides the housing interior into an oil reservoir 148 and a pump compartment 149. The oil reservoir 148 is divided by four vertically extending partitions 150, 151, 152 and 153 into four chambers 154, 155, 156 and 157. The partition 150 is imperforate in order to separate the chamber 154 from the chamber 157. The other partitions, i. e., the partitions 151, 152 and 153 have holes therein so that oil may flow from the chamber 154 into the chamber 155, thence into the chamber 156 and finally into the chamber 157. The partitions 151, 152 and 153 form, in effect, baffles and result in the oil being cooled in connection with flow thereof from the chamber 154 into the chamber 157 via the chambers 155 and 156. The pump 145 is disposed in the pump compartment 149 and is of the well known constant pressure variable volume type. It embodies a casing 158 and a vane equipped rotor (not shown) in the housing. The rotor is surrounded by a spring loaded ring (also not shown) which is movably mounted and adjusts itself automatically so that the pumpage is always under constant pressure and has a rate of flow corresponding to that required. The rotor is driven at a constant speed by a unidirectional electric motor 159. The latter is mounted in the pump compartment 149 and is arranged so that the armature shaft thereof is in coaxial relation with the pump rotor. The housing 158 of the pump has an inlet 160 and an outlet 161. The inlet 160 is connected by a pipe 162, a header 163 and filters 164 to receive oil from the chamber 157 of the oil reservoir. One end of the pipe 144 is connected to the outlet 161 and the other end is connected to the top portion of the body 117 of the device 78 so that it communicates with the inlet port 135. When the pump 145 is driven by the electric motor 159 oil is drawn into the pump from the oil reservoir via the filters 164, the header 163 and the pipe 162 and is forced under pressure through the pipe 144 into the inlet port 135. The port 136 in the body 117 is connected by a pipe 165 to the duct 86 in the outer head 84 of the cylinder 81 of the cylinder and piston device 76. The port 137 in the body 117 is connected by a pipe 166 to the duct 92 in the inner head 85 of the cylinder 81. The exhaust ports 138 and 139 in the body 117 of the valve type device 78 are cross connected by a duct 167. Such duct is connected to the chamber 154 of the oil reservoir 148 in the housing 146 by a return pipe 168. The valve spool 118 of the valve type controlling device 78 is slidably mounted in the bore 134 in the body 117 and embodies on the end thereof that is remote from the angle bracket 131 a coaxial actuating rod 169. The latter as shown in Figure 16, extends slidably through a packing gland 170 in a head 171 and has on its outer end a screw threaded stem 172. The head 171 is oppositely disposed with respect to the angle bracket 131. The valve spool 118 is provided in its central portion with two spaced apart annular grooves 173 and 174. Directly outwards of the annular groove 173 the valve spool 118 is tapered inwards in order to form an annular groove 175 which flares inwards and communicates with the outer end of the groove 173. Directly outwards of the groove 174 the valve spool 118 is tapered inwards in order to form an annular groove 176 which flares inwards and communicates with the outer end of the groove 174. When the valve spool 118 is centrally positioned as shown in Figure 16 the valve type controlling device 78 is in a closed position due to the fact that the portion of the valve between the grooves 173 and 174 closes communication between the inlet port 135 and the ports 136 and 137. When the spool valve is shifted towards the angle bracket 131 the groove 173 establishes communication between the inlet port 135 and the port 136 and the inwardly flared groove 176 establishes communication between the port 137 and the exhaust port 139. This results in oil under pressure flowing from the inlet port 135 into the port 136 via the groove 173 and thence through the pipe 165 into the outer end of the cylinder 81 of the cylinder and piston unit 76, thus causing sliding of the piston toward the cylinder head 85 of the cylinder 81 and counter-clockwise swinging of the jib 27 as viewed in Figures 3 and 9. It also results in the oil in the inner end of the cylinder 81 returning to the chamber 154 of the oil reservoir 148 via the pipe 166, the port 137, the groove 176, the port 139, the cross duct 167, and the return pipe 168. The speed of counterclockwise swinging of the jib is dependent upon the amount of sliding movement of the valve spool 118 in the direction of the angle bracket 131 because as the valve spool is shifted progressively toward the angle bracket the groove 176, due to the inward flare thereof, progressively increases the area of the communicating space between the ports 137 and 139. When the valve spool is shifted toward the bracket 131 in order to effect counterclockwise swinging of the jib the portion of the valve spool between the grooves 173 and 174 coacts with the land 141 to cut off communication between the inlet port 135 and the port 137. When the valve spool is in its neutral or closed position as shown in Figure 16 the portion of the valve spool outwards of the inwardly flared groove 175 coacts with the land 142 to cut off communication between the ports 136 and 138 and the portion of the valve spool that is outwards of the groove 176 cuts off communication between the ports 137 and 139 and hence the oil at opposite sides of the piston 82 of the unit 76 is maintained in a static condition and locks the jib 27 against movement. When the valve spool 118 is shifted in the direction of the head 171 the groove 174 establishes communication between the inlet port 135 and the port 137 and the inwardly flared groove 175 establishes communication between the port 136 and the exhaust port 138. This results in oil under pressure flowing from the inlet port 135 into the port 137 via the groove 174 and thence through the pipe 166 into the inner end of the cylinder 81 of the cylinder and piston unit 76, thus causing sliding of the piston toward the cylinder head 84 of the cylinder 81 and clockwise swinging of the jib 27 as viewed in Figures 3 and 9. It also results in the oil in the outer end of the cylinder 81 returning to the chamber 154 of the oil reservoir 148 via the pipes 165, the port 136, the groove 175, the port 138, the cross duct 167 and the return pipe 168. The speed of clockwise swinging of the jib is dependent upon the amount of sliding movement of the valve spool 118 in the direction of the head 171 because as the spool valve is shifted progressively toward the head 171 the groove 175, due to its inward flare, progressively increases the area of the communicating space between the ports 136 and 138. The valve type controlling device 78 operates in response to shift of the valve spool 118 from its neutral or closed position in one direction or the other to actuate the cylinder and piston unit 76 for jib swinging purposes and, as previously pointed out, the speed of swinging movement of the jib is dependent upon the degree or amount of shift of the valve spool away from its neutral position.

Figure 13:
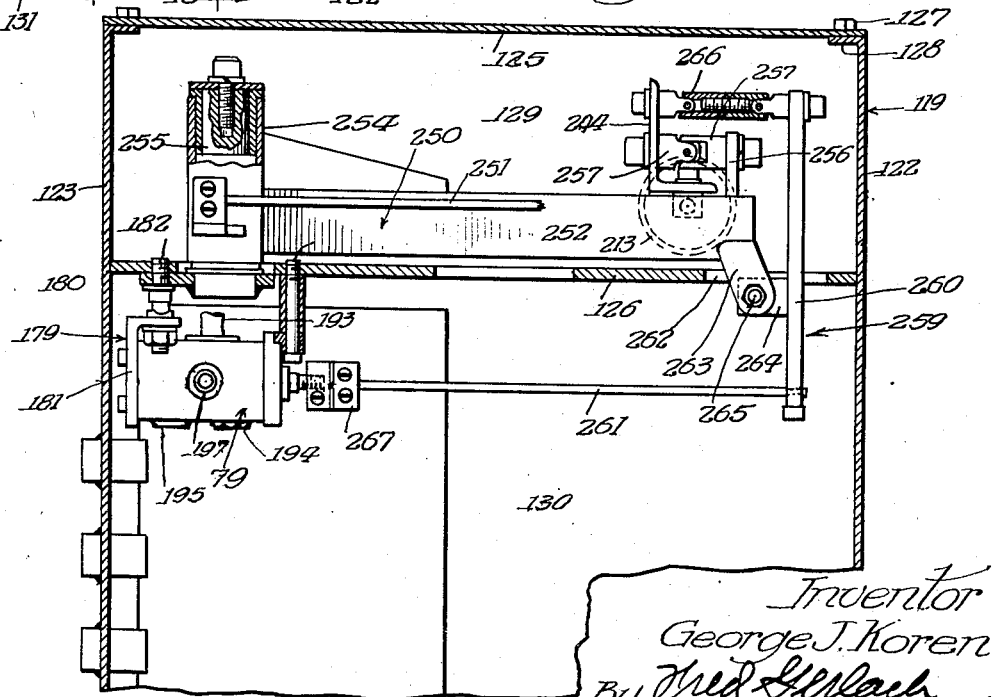
Figure 13 is a fragmentary vertical longitudinal section taken on the line 13—13 of Figure 12 and illustrating in detail the construction, design and arrangement of the operating connections between the joy-stick variety lever and the valve type controlling devices.
Figure 14:
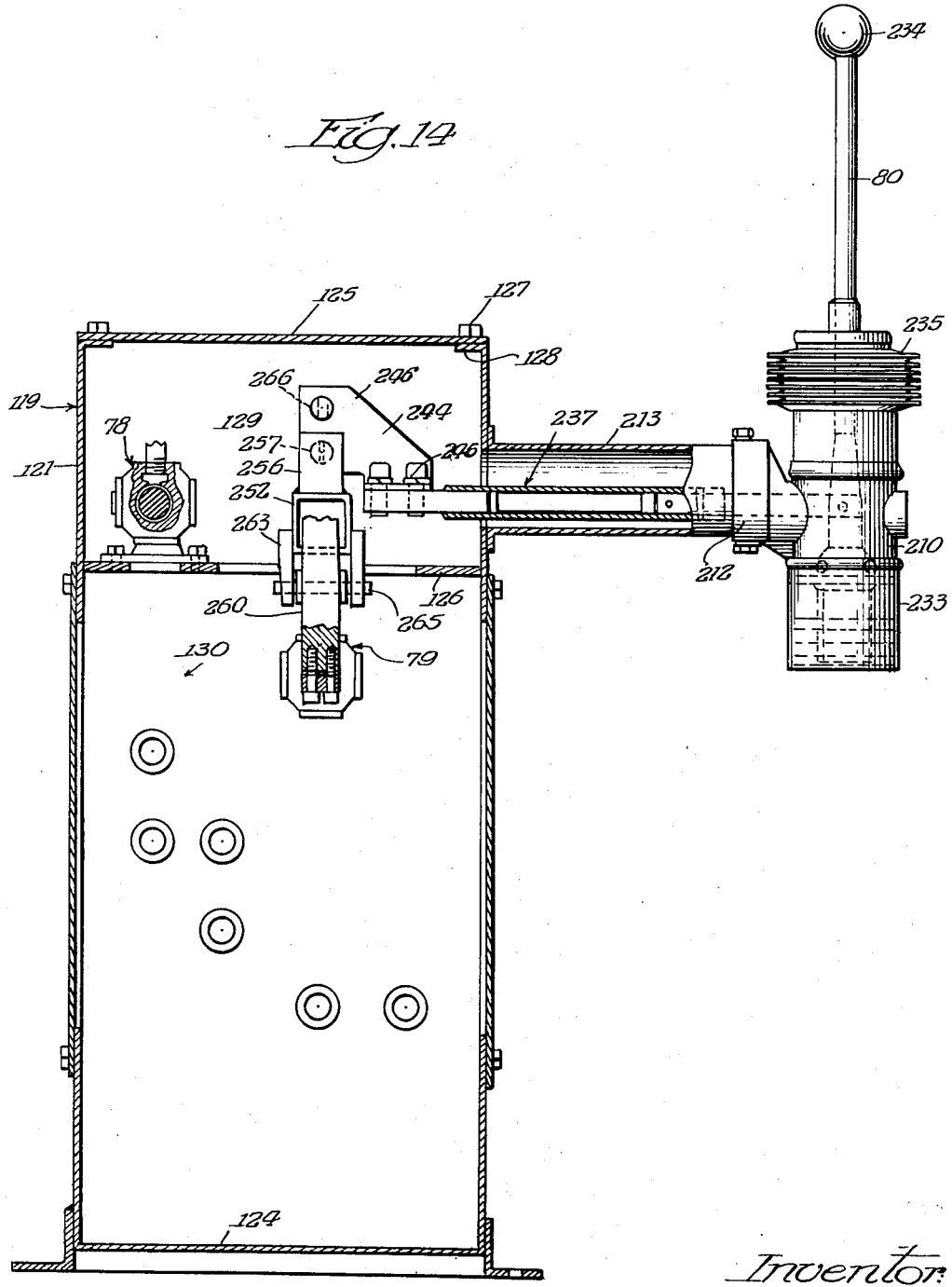
Figure 14 is a vertical transverse section on the line 14—14 of Figure 12.
Figure 17:
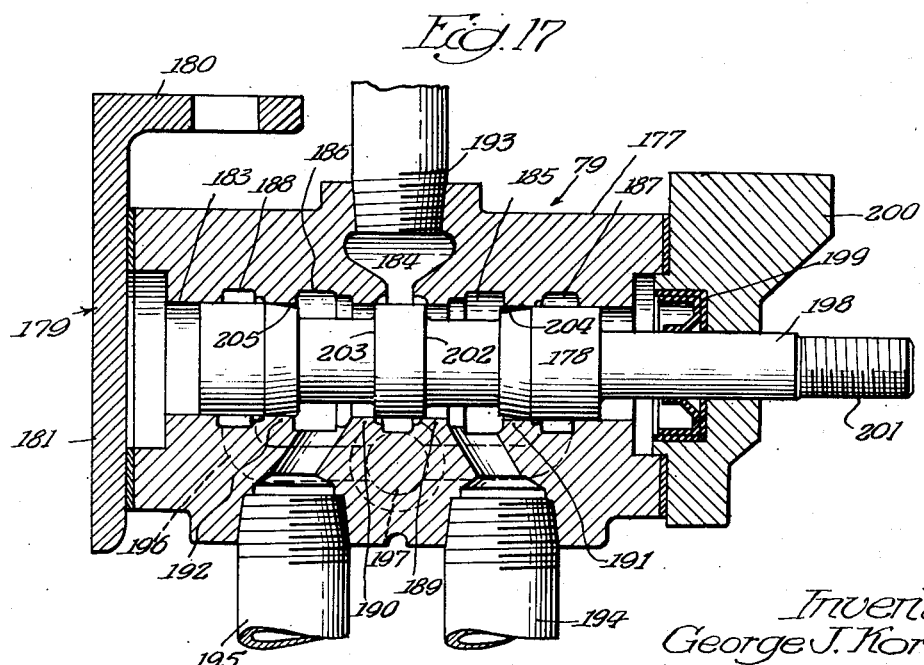
Figure 17 is an enlarged longitudinal section of the valve type device for controlling hydraulic actuation of the cylinder and piston unit for swinging the projector carrying arm relatively to the jib.

The valve type device 79 (see Figure 17) serves as a medium for controlling the flow of oil under pressure to and from opposite ends of the cylinder 99 of the cylinder and piston unit 77 and comprises a horizontally elongated body 177 and a valve spool 178. It is actuated by the joy-stick variety lever 80, as hereinafter described and, as best shown in Figure 13, is located under the partition 126 and directly inwards of the end wall 123 as shown in Figure 13. An angle bracket 179 serves to secure the device 79 in place. This bracket comprises a horizontally extending upper leg 180 and a vertically extending depending leg 181. The upper leg 180 is connected by bolts 182 to the partition 126. The depending leg 181 of the bracket 179 is bolted or otherwise fixedly secured to one end of the body 177 of the device 79. Such device extends lengthwise of the housing structure 119. The body 177 is provided in the central portion thereof with a longitudinally extending bore 183 and embodies around and in communication with the bore a centrally disposed annular inlet port 184, a pair of annular ports 185 and 186 outwards of the inlet port 184 and a pair of annular exhaust ports 187 and 188 outwards of the ports 185 and 186. The inlet port 184 and the port 185 are separated by an annular land 189; the inlet port 184 and the port 186 are separated by an annular land 190; the port 185 and the exhaust port 187 are separated by an annular land 191; and the ports 186 and 188 are separated by an annular land 192. The inlet port 184 is connected by a branch pipe 193 to the pipe 144 in order to receive oil under pressure from the pump 145 in the pump compartment 149 of the housing 146. The port 185 in the body 177 is connected by a pipe 194 to the duct 104 in the inner head 102 of the cylinder 99 of the cylinder and piston device 77. The port 186 in the body 177 is connected by a pipe 195 to the duct 109 in the head 103 at the outer end of the cylinder 99. The exhaust ports 187 and 188 in the body 177 of the valve type device 79 are cross connected by a duct 196. Such duct is connected to the return pipe 168 by a branch pipe 197. The valve spool 178 of the valve type controlling device 79 is slidably mounted in the bore 183 in the body 177 and embodies on the end thereof that is remote from the angle bracket 179 a coaxially positioned actuating rod 198. The latter, as shown in Figure 17, extends slidably through a packing gland 199 in a head 200 and has on its outer end a screw threaded stem 201. The head 200 is oppositely disposed with respect to the angle bracket 179. The valve spool 178 is provided in its central portion with two spaced apart annular grooves 202 and 203. Directly outwards of the annular groove 202 the valve spool 178 is tapered inwards in order to form an annular groove 204 which flares inwards and communicates with the outer end of the groove 202. Directly outwards of the groove 203 the valve spool 178 is tapered inwards in order to form an annular groove 205 which flares inwards and communicates with the outer end of the groove 203. When the valve spool 178 is centrally positioned as shown in Figure 17 the valve type controlling device 79 is in a closed position due to the fact that the portion of the valve spool 178 between the grooves 202 and 203 closes communication between the inlet port 184 and the ports 185 and 186. When the valve spool 178 is shifted towards the angle bracket 179 the groove 202 establishes communication between the inlet port 184 and the port 185 and the inwardly flared groove 205 establishes communication between the port 186 and the exhaust port 188. This results in oil under pressure flowing from the inlet port 184 into the port 185 via the groove 202 and thence through the pipe 194 into the inner end of the cylinder 99 of the cylinder and piston unit 77, thus causing sliding of the piston 100 toward the cylinder head 103 of the cylinder 99 and counterclockwise swinging of the arm 28 as viewed in Figures 3 and 9. It also results in the oil in the outer end of the cylinder 99 returning to the chamber 154 of the oil reservoir 148 via the pipe 195, the port 186, the groove 205, the port 188, the cross duct 196, the branch pipe 197 and the return pipe 168. The speed of counterclockwise swinging of the arm is dependent upon the amount of sliding movement of the valve spool 178 in the direction of the angle bracket 179 because as the valve spool is shifted progressively toward the angle bracket the groove 205, due to the inward flare thereof, progressively increases the area of the communicating space between the ports 186 and 188. When the valve spool is shifted towards the bracket 179 in order to effect counterclockwise swinging of the arm 28 the portion of the valve spool between the grooves 202 and 203 coacts with the land 190 to cut off communication between the inlet port 184 and the port 186. When the valve spool 178 is in its neutral or closed position as shown in Figure 17 the portion of the valve spool outwards of the inwardly flared groove 204 coacts with the land 191 to cut off communication between the ports 185 and 187 and the portion of the valve spool that is outwards of the groove 205 cuts off communication between the ports 186 and 188 and hence the oil at opposite sides of the piston 100 of the unit 77 is maintained in a static condition and locks the arm 28 against movement. When the spool valve 178 is shifted in the direction of the head 200 the groove 203 establishes communication between the inlet port 184 and the port 186 and the inwardly flared groove 204 establishes communication between the port 185 and the exhaust port 187. This results in oil under pressure flowing from the inlet port 184 to the port 186 via the groove 203 and thence through the pipe 195 into the outer end of the cylinder 99 of the cylinder and piston unit 77, thus causing sliding of the piston 100 toward the cylinder head 102 and clockwise swinging of the arm 28 as viewed in Figures 3 and 9. It also results in the oil in the inner end of the cylinder 99 returning to the chamber 154 of the oil reservoir 148 via the pipe 194, the port 185, the groove 204, the exhaust port 187, the cross duct 196, the branch pipe 197 and the return pipe 168. The speed of clockwise swinging of the arm is dependant upon the amount of sliding movement of the spool valve 178 in the direction of the head 200 because as the spool valve is shifted progressively toward the head 200 the groove 204, due to its inward flare, progressively increases the area of the communicating space between the ports 185 and 187. The valve type controlling device 79 operates in response to shift of the spool valve 178 from its neutral or closed position in one direction or the other to actuate the cylinder and piston unit 77 for arm swinging purposes and, as previously pointed out, the speed of swinging movement of the arm is dependant upon the degree or amount of shift of the spool valve 178 away from its neutral or closed position.

In order to prevent abrupt stoppage of the jib 27 when the valve spool 118 is shifted into its neutral or closed position the pipes 165 and 166 are connected by a by-pass pipe 206 which has disposed therein a needle valve 207. A by-pass pipe 208 with a needle valve 209 therein extends between and connects the pipes 194 and 195 and serves to prevent abrupt stoppage of the projector carrying arm 28 when the valve spool 178 of the valve type controlling device 79 is shifted or returned to its neutral or closed position. As shown in Figure 18, the pipes 194 and 195 include flexible hoses adjacent the proximal end of the jib 27 in order that the end portions thereof that are adjacent the jib are free to swing horizontally with the jib. Also, as shown in Figure 18, the pipes 165, 166, 194 and 195 have flexible hoses adjacent the cylinder heads of the units 76 and 77 in order to permit pivotal movement of such units.

Figure 15:
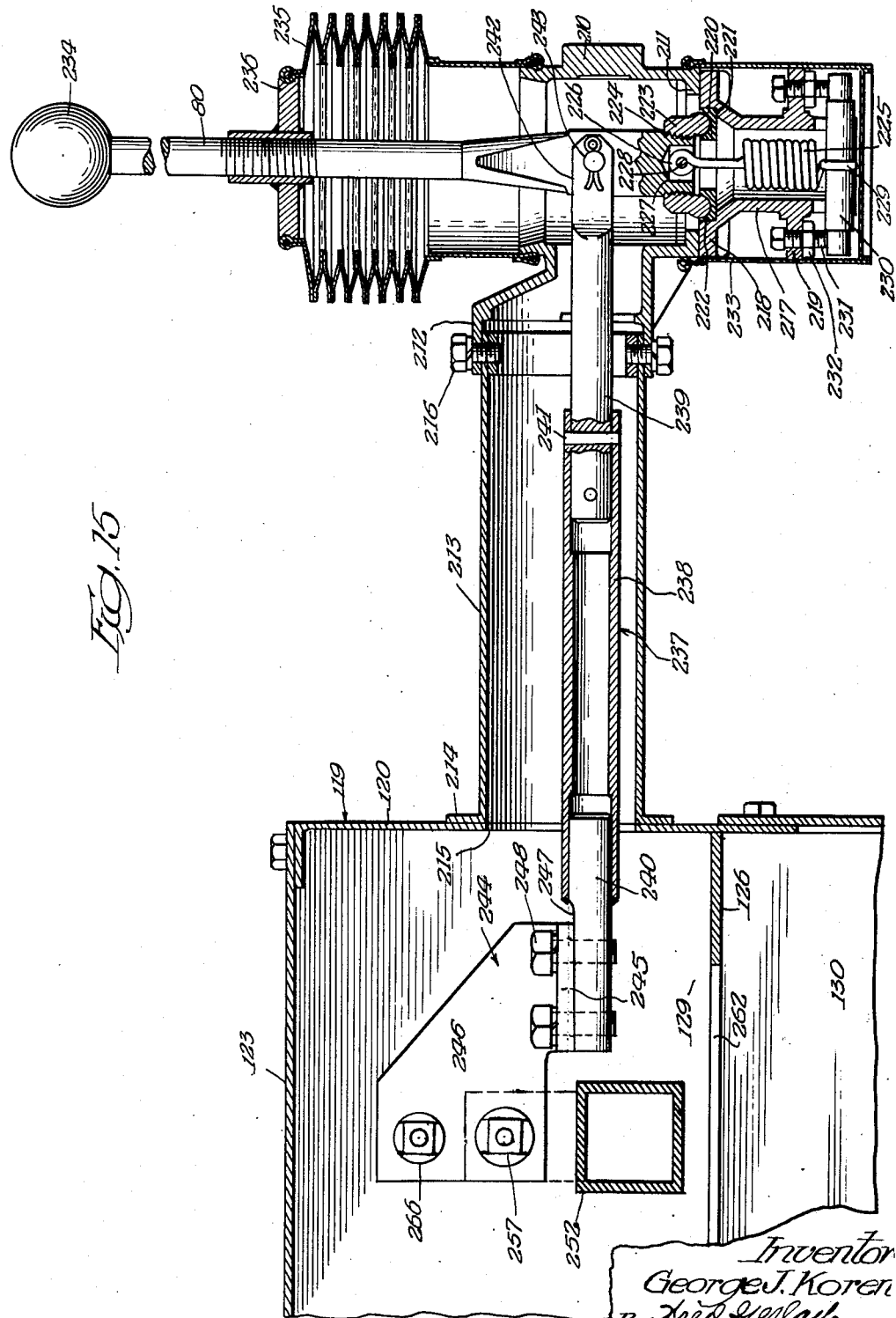
Figure 15 is an enlarged vertical section taken on the line 15—15 of Figure 12 and showing the construction, design and manner of mounting of the upstanding joy-stick variety lever for actuating the valve type controlling devices in response to tilting or angular displacement thereof.

The joy-stick variety lever 80 for actuating singly or compoundly the valve type controlling devices 78 and 79 is located a small distance forwards of the front wall 120 of the box-like housing structure 119 and has the lower end thereof disposed in a vertically extending, cylindrical, open ended housing 210. The latter is provided at its lower end with an annular, inwardly extending flange 211 and embodies at the rear portion thereof an integral laterally extending sleeve-like extension 212. A horizontally extending tube 213 serves to support the housing 210 in fixed relation with the housing structure 119. The inner or rear end of the tube embodies an outwardly extending annular flange 214 which fits against, and is suitably secured to, the upper portion of the front wall of the housing structure 119. As shown in Figure 2, the tube 213 is positioned a short distance inwards of the side wall 122 of the housing structure and is substantially aligned with the valve type controlling device 78. The front wall 120 of the housing structure has a circular hole 215 which registers with the inner end of the tube and serves to establish communication between the tube interior and the upper compartment 129 in the housing structure 119. The outer or front end of the tube 213 fits within the sleeve-like extension 212 and is secured thereto by bolts 216. The interior of the extension 212 is in communication with the interior of the housing 210 as shown in Figure 15 of the drawings. Directly beneath, and in alignment with, the housing 210 is a sleeve-like member 217, the upper end of which is provided with an integral outwardly extending flange 218 and the lower end of which is provided with a pair of integral, outwardly extending, diametrically opposite lugs 219. The flange 218 abuts against, and is bolted or otherwise fixedly secured to, the inwardly extending flange 211 on the lower end of the housing 210. Within the upper end of the sleeve-like member 217 is a ring 220 and this has the outer margin thereof disposed within an annular seat 221 in the upper end of the member 217. The upper portion of the ring 220 is provided with a concentric circular groove 222 of semi-circular cross section. The lower end of the joy-stick variety lever 80 directly overlies the ring 220 and is provided with a collar 223. The latter is fixedly secured to the lower end of the lever 80 by a screw thread connection 224 and has the lower end thereof disposed normally within, and shaped conformably to, the circular groove 222 in the upper portion of the ring 220. The ring 220 and the collar 223 coact to form a mount whereby the joy-stick variety lever 80 is permitted to be swung or tilted laterally to a limited extent in any direction from a vertical neutral position. A tension spring 225 serves automatically to return the lever 80 to its neutral position after angular displacement thereof. Such spring is disposed for the most part within the sleeve-like member 217 beneath the cylindrical housing 210. The upper end of the spring 225 is provided with an eye 226 and this is disposed within a downwardly facing socket 227 in the lower end of the lever 80 and surrounds a crosspin 228 which extends across the socket 227 and has its ends disposed in diametrically opposite holes in the lower end of the lever 80. The lower end of the tension spring 225 is shaped to form an eye 229 which surrounds the central portion of a horizontally extending pin 230. The ends of the pin abut against the lower ends of a pair of cap screws 231. Such screws extend through internally threaded holes in the lugs 219 on the lower end of the sleeve-like member 217 and serve as a medium or instrumentality for adjusting the load or tension of the spring 225. When the screws 231 are turned so that they feed downwards they operate through the medium of the pin 230 to increase the tension of the spring and when the screws are reversely turned so as to feed upwards they result in lessening of the tension of the spring 225. Lock nuts 232 are mounted on the shanks of the screws and operate when tightened to lock the screws against turning after a spring adjusting operation. A leather cup shaped member 233 surrounds and houses the sleeve-like member 217, the pin 230 and the adjusting screws 231. The upper end of the side wall of the member 233 is suitably removably connected to the lower end of the housing 211. The upper end of the joy-stick variety lever 80 is provided with a ball type handle 234 whereby the lever may be gripped by the operator. The upper end of the cylindrical housing 210 is closed against entry of dust and other foreign matter by a vertically extending, bellows type guard sleeve 235. The lower end of this sleeve is connected to the upper end of the housing 210 and the upper end of the sleeve is connected by a ring 236 to the lower central portion of the lever 80. The sleeve 235 is formed of flexible material in order that it does not interfere with tilting or angular displacement of the joy-stick variety lever. Associated with the lever 80 is a horizontally extending, composite, motion imparting rod 237. This rod extends longitudinally through the tube 213 and consists of a tubular intermediate part 238 and shaft-like end parts 239 and 240. The end part 239 extends between the outer end of the tubular intermediate part 238 and the lower end of the joy-stick variety lever 80. The inner end of the end part 239 fits within the outer end of the tubular intermediate part 238 and is fixedly secured thereto by way of a crosspin 241. The outer end of the end part 239 is shaped to form a fork 242 which straddles the lower end of the lever 80 at a point directly above the collar 223 and is pivotally connected thereto by a horizontal pin 243. As shown in Figure 15, the end part 239 extends through the sleeve-like extension 212. The shaft-like end part 240 of the rod 237 is disposed within the upper compartment 129 in the stationarily mounted housing structure 119. The inner end of the end part 240 fits within, and is suitably fixedly secured to, the adjacent end of the tubular intermediate part 238 of the rod 237 and the outer end of the part 240 is provided with a fixed angle bracket 244. The latter consists of a laterally extending leg 245 and an upwardly extending leg 246. The leg 245 is formed integrally with the lower marginal part of, and extends at right angles to, the upwardly extending leg 246. It fits against a flat 247 on the upper portion of the outer end of the rod end part 240 and is secured in place by a pair of bolts 248. When the lever 80 is swung from its neutral position towards the housing structure 119 the angle bracket 244 moves toward the rear wall 121 of the housing structure and when the lever 80 is swung away from the housing structure the angle bracket moves toward the front wall of the housing structure. Sidewise swinging of the lever 80 operates to rock the angle bracket 244 laterally. If the lever 80 is swung into an intermediate position the composite rod 237 effects a compound movement of the angle bracket 244 in that it causes the bracket to be displaced bodily and at the same time rocked correspondingly to the lever.

A mechanical connection 249 (see Figures 12 and 13) serves so operatively to connect the joy-stick variety control lever 80 to the valve spool 118 of the valve type controlling device 78 that the latter actuates the cylinder and piston unit 76 in such manner that the projector 29 through the medium of swinging of the jib moves correspondingly to swinging of the lever 80 towards and away from the housing structure 119. Such connection is disposed in the upper compartment 129 of the housing structure and comprises a horizontal bell crank 250 and a horizontal flexible connecting rod 251. The bell crank 250 of the operating connection 249 consists of a long arm 252 and a short arm 253 and a vertically extending pivot sleeve 254. The arm 252 extends lengthwise of the housing structure as shown in Figure 12 and the arm 253 extends at substantially right angles to the arm 252 and is disposed at the end of the last mentioned arm that is nearer the end wall 123 of the housing structure 119. The pivot sleeve 254 is connected to the adjacent ends of the arms 252 and 253 and is mounted rotatably on a vertically extending spindle 255. The latter is connected to, and projects upwards from, the horizontal partition 126 which divides the interior of the housing structure 119 into the upper compartment 129 and the lower compartment 130. The sleeve 254 coacts with the spindle 255 to permit the bell crank 250 to oscillate back and forth in a horizontal plane. The end of the arm 252 that is adjacent the end wall 122 of the housing structure 119 underlies the angle bracket 244 on the inner end of the rod 237 and is provided with a fixed upwardly extending lug 256. The latter is connected to the inner lower corner of the upwardly extending leg 246 of the angle bracket 244 by a universal coupling 257. The latter is so constructed and designed that it imparts swinging or oscillating movement to the bell crank 249 in response to swinging of the joy-stick variety lever 80 towards and away from the housing structure 119 while at the same time permitting the angle bracket 244 to rock laterally in response to lateral swinging movement of the lever 80. The rod 251 extends lengthwise of the housing structure 119 and has one end thereof suitably connected to the outer or distal end of the arm 253 of the bell crank 250. The other end of the rod 251 is connected by a two-piece clamp 258 to the screw threaded stem 172 on the outer end of the actuating rod 169 for the valve spool 118 of the valve type controlling device 78. When the joy-stick variety lever 80 is swung towards the housing structure 119 it operates through the medium of the rod 237 to swing the bell crank 250 in a clockwise direction as viewed in Figure 12. This results in the rod 251 sliding the valve spool 118 toward the head 171. As heretofore pointed out, such sliding movement on the part of the valve spool results in oil under pressure being delivered through the pipe 166 into the inner end of the cylinder 81 of the cylinder and piston unit 76. Introduction of oil under pressure into the inner end of the cylinder 81 causes the piston 82 to slide towards the outer end of the cylinder 81 thereby effecting clockwise swinging of the jib 27 and movement of the projector 29 in the same direction as the lever 80. When the lever 80 is swung away from the housing structure 119 the rod 237 causes the bell crank 250 of the operating connection 249 to swing in a counterclockwise direction as viewed in Figure 12. Such swinging on the part of the bell crank results in the rod 251 sliding the valve spool 118 of the device 78 towards the angle bracket 133. Such sliding movement on the part of the valve spool results in oil under pressure flowing through the pipe 165 into the outer end of the cylinder 81 of the cylinder and piston device 76. This, in turn, results in the piston 82 of the device 76 sliding towards the inner cylinder head 85 and causing counterclockwise movement of the jib 27. From the foregoing it is clearly manifest that swinging of the lever 80 towards or away from the housing structure 119 results in such swinging of the jib 27 that the projector 29 is caused to move in substantially the same direction as the lever. The speed of movement of the projector is proportional to the amount of angular displacement of the joy-stick variety lever 80 from its neutral position.

A mechanical connection 259 (see Figure 13) serves so operatively to connect the joy-stick variety control lever 80 to the valve spool 178 of the valve type controlling device 79 that the latter actuates the cylinder and piston unit 77 in such manner that the projector 29 through the medium of swinging of the arm 28 moves in the same direction as lateral swing of the lever 80. Such connection 259 comprises an upstanding lever 260 and a horizontal rod 261. The lever 260 extends through an opening 262 in the partition 126 in the housing structure 119 and is centrally fulcrummed to swing lengthwise of the housing structure. The fulcrum for the lever 260 consists of a downwardly and outwardly extending lug 263 on the outer end of the long arm 252 of the bell crank 250, an inwardly extending lug 264 on the central portion of the lever 260 and a horizontal pivot bolt 265 between the two lugs. The upper end of the lever 260 is connected to the upper inner corner of the upwardly extending leg 246 of the angle bracket 244 on the inner end of the rod 237 by a universal coupling 266. The latter is so arranged and designed that it causes the lever 260 to swing in response to rocking of the angle bracket 244 while at the same time permitting the angle bracket to move bodily in and out without swinging the lever 260. The rod 261 extends lengthwise of the housing structure 119 and is disposed beneath the partition 126. One end of the rod 261 is suitably connected to the lower end of the lever 260 and the other end is connected by a two-piece clamp 267 to the screw threaded stem 201 on the actuating rod 198 for the valve spool 178 of the valve type controlling device 79. When the joy-stick variety lever 80 is swung laterally in the direction of the end wall 123 of the housing structure 119 the angle bracket 244 on the inner end of the rod 237 rocks in a counterclockwise direction as viewed in Figure 13 and causes through the medium of the universal coupling 257 counterclockwise swinging of the lever 260. Such swinging on the part of the lever results in the rod 261 moving towards the end wall 122 of the housing structure 119 and causes the valve spool 178 of the device 79 to slide towards the head 200. As previously pointed out, sliding movement of the valve spool 178 towards the head 200 results in oil under pressure flowing through the pipe 195 into the outer end of the cylinder 99 of the cylinder and piston unit 77. Upon entry of oil under pressure into the outer end of the cylinder 99 the piston 100 is caused to slide towards the inner end of said cylinder and operates through the medium of the piston rod 110 and the laterally extending lug 112 to swing the projector carrying arm 28 in a clockwise direction as viewed in Figure 9. Such swinging of the arm corresponds in direction to lateral swinging of the joy-stick variety lever 80 towards the end wall 123 of the housing structure 119. When such lever is swung laterally in the direction of the end wall 122 of the housing structure the angle bracket 244 rocks in a clockwise direction as viewed in Figure 13 and causes clockwise swinging of the lever 260. Such swinging on the part of the lever operates through the medium of the rod 261 to slide the valve spool 178 of the unit 79 towards the angle bracket 179. When said valve spool is shifted towards the angle bracket 179 it results in oil under pressure flowing through the the pipe 194 into the inner end of the cylinder 99 of the cylinder and piston unit 77. Upon entry of oil under pressure into the inner end of said cylinder the piston 100 is caused to slide towards the outer end of the cylinder and results in counterclockwise swinging of the projector carrying arm 28 and the projector 29 moving correspondingly to the lever 80. From the foregoing it is clearly manifest that lateral swinging of the lever 80 in either direction results in such swinging of the arm 28 that the projector 29 is caused to move in substantially the same direction as the lever. The speed of movement of the projector is proportional to the amount of angular displacement of the joy-stick variety lever 80 from its neutral position.

The operating connections 249 and 259 are so designed and constructed that they permit the valve type controlling devices 77 and 78 to be actuated singly or compoundly in response to swinging of the joy-stick variety lever 80. If the lever 80 is swung in any direction from its neutral position the rotary projector 29 is caused to move in the same direction. If, for example, the lever 80 is moved back and forth in a straight line the projector will also move in substantially a straight line. As soon as the lever 80 is released by the operator it is returned to its neutral position by the tension spring 225 with the result that the projector is immediately brought to rest. If the lever is angularly deflected and then moved in a circle the projector will also move in substantially a circle. The housing structure 119 may be placed in either of the two dotted line positions shown in Figure 1 without changing the relationship of movement of the projector 29 with respect to the joy-stick variety lever 80.

When it is desired to fill or ram a subjacent flask by way of the apparatus the electric motors 55, 65 and 159 are set in operation by closing the electric circuits therefor. Operation of the motor 65 results in supply of sand from the hopper 66 into the hopper 75 and operation of the electric motor 55 results in drive of the endless conveyor 58 and the rotor 50 of the projector 29. As heretofore pointed out, the endless conveyor 58 serves to discharge sand in stream form into the upper portion of the projector housing 49 and the cup shaped blade 53 of the rotor operates to form the stream of sand into wads and project the wads downwards into the subjacent flask. Operation of the electric motor 159 results in drive of the constant pressure, variable volume pump 145 which draws oil from the compartment 151 of the reservoir 148 and pumps the oil under pressure through the pipe 144 and the branch pipe 193 to the inlet in the bodies of the valve type controlling devices 78 and 79. When it is desired to move the projector 29 over the subjacent flask so as to ram all portions of the latter the joy-stick variety lever 80 is swung from its neutral position in the direction in which it is desired to move the projector. Swinging or angular displacement of the lever serves singly or compoundly to actuate the devices 78 and 79 so that they, in turn, energize their respective cylinder and piston units to cause the projector 29 to move correspondingly to the lever.

The herein described flask filling apparatus effectively and efficiently fulfills its intended purpose and is characterized by the fact that the hydraulic control system for effecting desired movement of the rotary projector is essentially simple in design and permits the operator to station himself in any convenient location at one side of the standard to which the jib is pivotally connected. The apparatus is further characterized by the fact that the hydraulic control system, with the exception of the cylinder and piston units 76 and 77 and the pipe sections associated therewith, is mounted or supported independently of the jib and projector carrying arm.

The invention is not to be understood as restricted to the details set forth since these may be modified within the scope of the appended claims without departing from the spirit and scope of the invention.

Having thus described the invention what I claim as new and desire to secure by Letters Patent is:

1. An hydraulic control system designed for use in connection with a foundry flask filling apparatus of the type that comprises a stationary standard, a horizontal jib having one end thereof pivotally connected to the standard so that it is capable of being swung back and forth about a vertical axis, a horizontal arm having one end thereof pivotally connected to the distal end of the jib so that it is capable of swinging back and forth about a vertical axis, a power driven projector mounted on the distal end of the arm and adapted to deliver sand in wad form into a subjacent flask, a double acting hydraulic unit extending between the standard and the jib and operative in response to supply of liquid under pressure to and from it to swing the jib relatively to the standard, and a double acting hydraulic unit extending between the jib and the arm and operative in response to supply of liquid under pressure to and from it to swing the arm relatively to the jib, said hydraulic control system being adapted to move the projector into different positions over the flask, including said hydraulic units, and comprising a stationary supporting structure positioned in close proximity to the standard, a joy-stick variety lever having at the lower end thereof mounting means in fixed relation with the supporting structure and operative to support the lever so that it is capable of swinging laterally in all directions from a neutral upstanding position, a horizontal rod having one end thereof connected by a horizontal pivot to the lever at a point a short distance above said mounting means, provided at its other end with a normally vertical member, and adapted when the lever is swung back and forth in a vertical plane extending lengthwise through the rod to be shifted longitudinally and when the lever is swung back and forth in a vertical plane at right angles to the first mentioned plane to be rocked bodily in a sidewise direction, a pair of valve type devices mounted fixedly on the supporting structure, connected to control the supply of liquid under pressure to and from the hydraulic units respectively, and including slidably mounted valve spools, and a pair of mechanical operating connections extending directly between the normally vertical member on said other end of the rod and the valve spools of the devices and operative in response to swinging movement of the joy-stick variety lever from its neutral position to actuate the devices in such manner that the latter so control the units as to cause the projector to move in substantially the same direction as said lever, one of said connections consisting of a right angle type bell crank mounted on the supporting structure, to swing back and forth in a horizontal plane, a universal coupling extending between and connected to said normally vertical member and the outer end of one arm of the bell crank and operative to swing the bell crank back and forth in response to longitudinal shift of the rod while at the same time permitting the rod to rock freely laterally, a laterally and flexible rod extending between and connected directly and fixedly to the outer end of the other end of the bell crank and the spool valve of one of the devices, said laterally flexible rod and the valve spool of the one device being arranged in longitudinal alignment with one another, extending at substantially right angles to said other arm of the bell crank and lying in the horizontal plane in which the bell crank is mounted to swing, the other operating connection consisting of an upstanding lever having the central portion thereof connected by a horizontal pivot to the outer end of said one arm of the bell crank so that it is capable of swinging back and forth in a vertical plane, a universal type coupling extending between and connected to said normally vertical member and the upper end of said upstanding lever and operative to swing such lever back and forth in response to lateral rocking of the rod, and a laterally flexible connecting rod extending between and connected directly and fixedly to the lower end of said upstanding lever and the valve spool of the other valve type device, said last mentioned laterally flexible connecting rod and the valve spool of said other valve type device being arranged in longitudinal alignment with one another, extending at substantially right angles to the upstanding lever and lying in the vertical plane in which said upstanding lever swings back and forth.

2. An hydraulic control system for use in connection with a foundry flask filling apparatus of the type that comprises a stationary standard, a horizontal jib having one end thereof pivotally connected to the standard so that it is capable of being swung back and forth about a vertical axis, a horizontal arm having one end thereof pivotally connected to the distal end of the jib so that it is capable of swinging back and forth about a vertical axis, a power driven projector mounted on the distal end of the arm and adapted to deliver sand in wad form into a subadjacent flask, a double acting hydraulic unit extending between the standard and the jib and operative in response to supply of liquid under pressure to and from it to swing the jib relatively to the standard, and a double acting hydraulic unit extending between the jib and the arm and operative in response to supply of liquid under pressure to and from it to swing the arm relatively to the jib, said hydraulic control system being adapted to move the projector into different positions over the flask, including said hydraulic units, and comprising a stationary box-like housing structure positioned in close proximity to the standard and embodying a vertical wall, a horizontal tube projecting outwards from said vertical wall and having the inner end thereof connected to said vertical wall and in communication with the interior of the housing structure, a joy-stick variety lever disposed adjacent the outer end of the tube and having at the lower end thereof mounting means in fixed relation with the outer end of the tube and operative to support the lever so that it is capable of swinging laterally in all directions from a neutral upstanding position, a horizontal rod extending loosely through the tube, having the outer end thereof connected by a horizontal pivot to the lever at a point a short distance away from said mounting means, provided at its inner end with a normally vertical member, and adapted when the lever is swung back and forth in a vertical plane extending lengthwise through the tube and rod to be shifted longitudinally and when the lever is swung back and forth in a vertical plane at right angles to the first mentioned plane to be rocked bodily in a sidewise direction, a pair of valve type devices mounted fixedly in the housing structure, connected to control the supply of liquid under pressure to and from the hydraulic units respectively, and including slidably mounted valve spools, and a pair of mechanical operating connections disposed wholly within the housing structure, extending directly between said normally vertical member and the valve spools of the devices, and operative in response to swinging movement of the joy-stick variety lever from its neutral position to actuate the devices in such manner that the latter so control the units as to cause the projector to move in substantially the same direction as said lever, one of said connections consisting of a bell crank mounted to swing back and forth in a horizontal plane, a universal coupling extending between and connected to said normally vertical member and the outer end of one arm of the bell crank and operative to swing the bell crank back and forth in response to longitudinal shift of the rod while at the same time permitting the rod to rock freely laterally, and direct connecting means between the outer end of the other arm of the bell crank and the valve spool of one of the devices, the other operating connection consisting of an upstanding lever having a pivot at its central portion so that it is capable of swinging back and forth about a horizontal axis, a universal type coupling extending between and connected to said normally vertical member and the upper end of the upstanding lever and operative to swing such lever back and forth in response to lateral rocking of the rod, and direct connecting means between the lower end of said upstanding lever and the valve spool of the other valve type device.

3. An hydraulic control system designed for use in connection with a foundry flask filling apparatus of the type that comprises a stationary standard, a horizontal jib having one end thereof pivotally connected to the standard so that it is capable of being swung back and forth about a vertical axis, a horizontal arm having one end thereof pivotally connected to the distal end of the jib so that it is capable of swinging back and forth about a vertical axis, a power driven projector mounted on the distal end of the arm and adapted to deliver sand in wad form downwards into a subjacent flask, a double acting hydraulic unit extending between the standard and the jib and operative in response to supply of liquid under pressure to and from it to swing the jib relatively to the standard, and a double acting hydraulic unit extending between the jib and the arm and operative in response to supply of liquid under pressure to and from it to swing the arm relatively to the jib, said hydraulic control system being adapted to move the projector into different positions over the flask, including said hydraulic units, and comprising a stationary box-like housing structure positioned in close proximity to the standard and embodying a vertical wall, a horizontal tube projecting outwards from said vertical wall and having the inner end thereof connected to said vertical wall and in communication with the interior of the housing structure, a joy-stick variety lever disposed adjacent the outer end of the tube and having at the lower end thereof mounting means in fixed relation with the outer end of the tube and operative to support the lever so that it is capable of swinging laterally in all directions from a neutral upstanding position, a horizontal rod extending loosely through the tube, having the outer end thereof connected by a horizontal pivot to the lever at a point a short distance above said mounting means, provided at its inner end with a normally vertical member, and adapted when the lever is swung back and forth in a vertical plane extending lengthwise through the tube and rod to be shifted longitudinally and when the lever is swung back and forth in a vertical plane at right angles to the first mentioned plane to be rocked laterally, a pair of valve type devices mounted fixedly in the housing structure, connected to control the supply of liquid under pressure to and from the hydraulic units respectively, and including slidably mounted valve spools, and a pair of mechanical operating connections disposed wholly within the housing structure, extending directly between the normally vertical member on the inner end of the rod and the valve spools of the devices, and operative in response to swinging movement of the joy-stick variety lever from its neutral position to actuate the devices in such manner that the latter so control the units as to cause the projector to move in substantially the same direction as said lever, one of said connections consisting of a right angle type bell crank mounted to swing back and forth in a horizontal plane, a universal coupling extending between and connected to said normally vertical member and the outer end of one arm of the bell crank and operative to swing the bell crank back and forth in response to longitudinal shift of the rod while at the same time permitting the rod to rock freely laterally, and a laterally flexible rod extending between and connected directly and fixedly to the outer end of the other arm of the bell crank and the spool valve of one of the devices, said laterally flexible rod and the valve spool of the one device being arranged in longitudinal alignment with one another, extending at substantially right angles to said other arm of the bell crank and lying in the horizontal plane in which the bell crank is mounted to swing, the other operating connection consisting of an upstanding lever having the central portion thereof connected by a horizontal pivot to the outer end of said one arm of the bell crank so that it is capable of swinging back and forth in a vertical plane, a universal type coupling extending between and connected to said normally vertical member and the upper end of said upstanding lever and operative to swing such lever back and forth in response to lateral rocking of the rod, and a laterally flexible connecting rod extending between and connected directly and fixedly to the lower end of said upstanding lever and the valve spool of the other valve type device, said last mentioned laterally flexible connecting rod and the valve spool of said other valve type device being arranged in longitudinal alignment with one another, extending at substantially right angles to the upstanding lever and lying in the vertical plane in which said upstanding lever swings back and forth.

References Cited in the file of this patent

UNITED STATES PATENTS

| Number | Name | Date |
|---|---|---|
| 1,230,458 | Bouery | June 19, 1917 |
| 1,717,652 | Beardsley et al. | June 18, 1929 |
| 1,874,635 | Scherer | Aug. 30, 1932 |
| 1,928,621 | Frede et al. | Oct. 3, 1933 |
| 1,931,185 | Firestone | Oct. 17, 1933 |
| 2,083,330 | Frede et al. | June 1, 1937 |
| 2,339,001 | Clay et al. | Jan. 11, 1944 |